US007227964B2

(12) United States Patent
Abe et al.

(10) Patent No.: US 7,227,964 B2
(45) Date of Patent: Jun. 5, 2007

(54) AUDIO SIGNAL PROCESSING APPARATUS AND AUDIO SIGNAL PROCESSING METHOD

(75) Inventors: Ryoji Abe, Kanagawa-ken (JP); Shin Ito, Kanagawa-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 732 days.

(21) Appl. No.: 10/447,907

(22) Filed: May 29, 2003

(65) Prior Publication Data

US 2003/0223599 A1 Dec. 4, 2003

(30) Foreign Application Priority Data

May 31, 2002 (JP) ............................ 2002-159392

(51) Int. Cl.
*H02B 1/00* (2006.01)

(52) U.S. Cl. ........................................ 381/123; 381/81

(58) Field of Classification Search ................. 700/94; 381/123, 122, 81
See application file for complete search history.

(56) References Cited

U.S. PATENT DOCUMENTS 5,592,471 A * 1/1997 Briskman .................. 455/506
6,178,317 B1 * 1/2001 Kroeger et al. ............. 455/296
7,027,601 B1 * 4/2006 Johnston ...................... 381/56

* cited by examiner

*Primary Examiner*—Vivian Chin
*Assistant Examiner*—Corey Chau
(74) *Attorney, Agent, or Firm*—Pearne & Gordon LLP

(57) ABSTRACT

Herein disclosed is an audio signal processing apparatus comprising first audio signal processing means for processing an audio signal within a first process time; second audio signal processing means for processing the audio signal within a second process time which is different from the first process time; audio signal delaying means for delaying the audio signal in response to each of the first process time of the first audio signal processing means and the second process time of the second audio signal processing means; selecting means for selectively receiving the audio signals respectively processed by the first and second audio signal processing means; and audio signal outputting means for selectively outputting the audio signal selectively received by the selecting means and the audio signal delayed by the audio signal delaying means.

1 Claim, 10 Drawing Sheets

AUDIO SIGNAL PROCESSING APPARATUS AND AUDIO SIGNAL PROCESSING METHOD

BACKGROUND OF THE INVENTION

1. Field of the Invention

The present invention relates to an audio signal processing apparatus and an audio signal processing method, and more particularly to an audio signal processing apparatus and an audio signal processing method of selectively outputting audio signals respectively processed by audio signal processing units to an exterior device.

2. Description of the Related Art

Up until now, there have been proposed a wide variety of conventional audio signal processing apparatuses available for, for example, a digital signal processor to be assembled in various kinds of audio-visual apparatuses for the purpose of being simple in construction and downsized, and inexpensive in production cost.

One typical example of the conventional audio signal processing apparatus of this type is disclosed in, for example, Japanese Patent Laying-Open Publication No. S63-236099 and shown in FIG. 10. The conventional audio signal processing apparatus 900 is shown in FIG. 10 as comprising an input terminal 901 having an audio signal inputted therein, first audio signal processing means 910 for processing the audio signal received from the input terminal 901, second audio signal processing means 920 for processing the audio signal received from the input terminal 901, and an output terminal 902 having the audio signal outputted therethrough.

The conventional audio signal processing apparatus 900 further comprises first switching means 921 for having the audio signal selectively received by the first and second audio signal processing means 910 and 920, second switching means 922 for selectively receive the audio signals respectively processed by the first and second audio signal processing means 910 and 920, and third switching unit 940 for selectively receive the audio signal processed by any one of the first and second audio signal processing means 910 and 920 and the audio signal not processed by any one of the first and second audio signal processing means 910 and 920.

The conventional audio signal processing apparatus 900 constructed as previously mentioned, however, encounters such a problem that the audio signal to be outputted to the exterior device is instantaneously interrupted when the audio signal to be outputted to the exterior device is switched from the audio signal processed by one of the first and second audio signal processing units 910 and 920 to the audio signal processed by the other of the first and second audio signal processing units 910 and 920.

SUMMARY OF THE INVENTION

It is, therefore, an object of the present invention to provide an audio signal processing apparatus and an audio signal processing method which can have the audio signal continuously outputted to the exterior device without being instantaneously interrupted when the audio signal to be outputted to the exterior device is switched from the audio signal processed by one of the first and second audio signal processing units to the audio signal processed by the other of the first and second audio signal processing units.

It is another object of the present invention to provide an audio signal processing apparatus which can enhance the quality of the audio signal to be outputted to the exterior device to ensure that the audio signal to be outputted to the exterior device is seamlessly switched from the audio signal processed by one of the audio signal processing units to the audio signal processed by the other of the audio signal processing units.

According to the first aspect of the present invention, there is provided an audio signal processing apparatus, comprising: first audio signal processing means for processing an audio signal within a first process time; second audio signal processing means for processing the audio signal within a second process time which is different from the first process time; audio signal delaying means for delaying the audio signal in response to each of the first process time of the first audio signal processing means and the second process time of the second audio signal processing means; audio signal outputting means for selectively outputting the audio signals respectively processed by the first and second audio signal processing means to an exterior device; and selecting means for allowing the audio signals respectively processed by the first and second audio signal processing means to be selectively received by the audio signal outputting means, and wherein the audio signal outputting means is operative to output the audio signal delayed by the audio signal delaying means to ensure that the audio signal to be outputted to the exterior device is seamlessly switched from the audio signal processed by one of the first and second audio signal processing means to the audio signal processed by the other of the first and second audio signal processing means when the audio signal to be received by the audio signal outputting means is switched by the selecting means from the audio signal processed by one of the first and second audio signal processing means to the audio signal processed by the other of the first and second audio signal processing means.

According to the second aspect of the present invention, there is provided an audio signal processing apparatus, comprising: first audio signal processing means for processing an audio signal having a signal level within a first process time; second audio signal processing means for processing the audio signal within a second process time which is different from the first process time; first selecting means for allowing the audio signal to be received by one of the first and second audio signal processing means; second selecting means for allowing the audio signal to be received by the other of the first and second audio signal processing means; signal level changing means for selectively attenuating the audio signals respectively processed by the first and second audio signal processing means when the audio signal to be outputted to an exterior device is switched from the audio signal processed by one of the first and second audio signal processing means to the audio signal processed by the other of the first and second audio signal processing means; and audio signal mixing means for mixing and outputting the audio signals received from the signal level changing means.

According to the third aspect of the present invention, there is provided an audio signal processing apparatus, comprising: a preparing step of preparing an audio signal processing apparatus, comprising: first audio signal processing means for processing an audio signal within a first process time; second audio signal processing means for processing the audio signal within a second process time which is different from the first process time; audio signal delaying means for delaying the audio signal in response to each of the first process time of the first audio signal processing means and the second process time of the second audio signal processing means; audio signal outputting means for selectively outputting the audio signals respectively processed by the first and second audio signal processing means, and selecting means for allowing the audio signals respectively processed by the first and second audio signal processing means to be selectively received by the audio signal outputting means; a first audio signal processing step of processing an audio signal within a first process time; a second audio signal processing step of processing the audio signal within a second process time which is different from the first process time; an audio signal delaying step of delaying the audio signal in response to each of the first process time of the first audio signal processing means and the second process time of the second audio signal processing means; an audio signal outputting step of selectively outputting the audio signals respectively processed by the first and second audio signal processing means; and a selecting step of allowing the audio signals respectively processed by the first and second audio signal processing means to be selectively received by the audio signal outputting means, and wherein the audio signal outputting step is of outputting the audio signal delayed by the audio signal delaying means to ensure that the audio signal to be outputted to the exterior device is seamlessly switched from the audio signal processed by one of the first and second audio signal processing means to the audio signal processed by the other of the first and second audio signal processing means when the audio signal to be received by the audio signal outputting means is switched by the selecting means in the selecting step from the audio signal processed by one of the first and second audio signal processing means to the audio signal processed by the other of the first and second audio signal processing means.

According to the fourth aspect of the present invention, there is provided an audio signal processing method, comprising: a preparing step of preparing an audio signal processing apparatus, comprising: first audio signal processing means for processing an audio signal having a signal level; second audio signal processing means for processing the audio signal; first selecting means for allowing the audio signal to be received by one of the first and second audio signal processing means; second selecting means for allowing the audio signal to be received by the other of the first and second audio signal processing means; signal level changing means for selectively attenuating the audio signals respectively processed by the first and second audio signal processing means when the audio signal to be outputted to an exterior device is switched from the audio signal processed by one of the first and second audio signal processing means to the audio signal processed by the other of the first and second audio signal processing means; and audio signal mixing means for mixing the audio signals received from the signal level changing means; a first audio signal processing step of processing an audio signal having a signal level; a second audio signal processing step of processing the audio signal; a first selecting step of allowing the audio signal to be received and processed by one of the first and second audio signal processing means; a second selecting step of allowing the audio signal to be received and processed by the other of the first and second audio signal processing means; a signal level changing step of selectively attenuating the audio signals respectively processed by the first and second audio signal processing means when the audio signal to be outputted to an exterior device is switched from the audio signal processed by one of the first and second audio signal processing means to the audio signal processed by the other of the first and second audio signal processing means; and audio signal mixing step of mixing and outputting the audio signals received from the signal level changing means.

BRIEF DESCRIPTION OF THE DRAWINGS

The features and advantages of an audio signal processing apparatus and an audio signal processing method according to the present invention will be more clearly understood from the following description taken in conjunction with the accompanying drawings in which.

DESCRIPTION OF THE EMBODIMENTS

Figure 1:
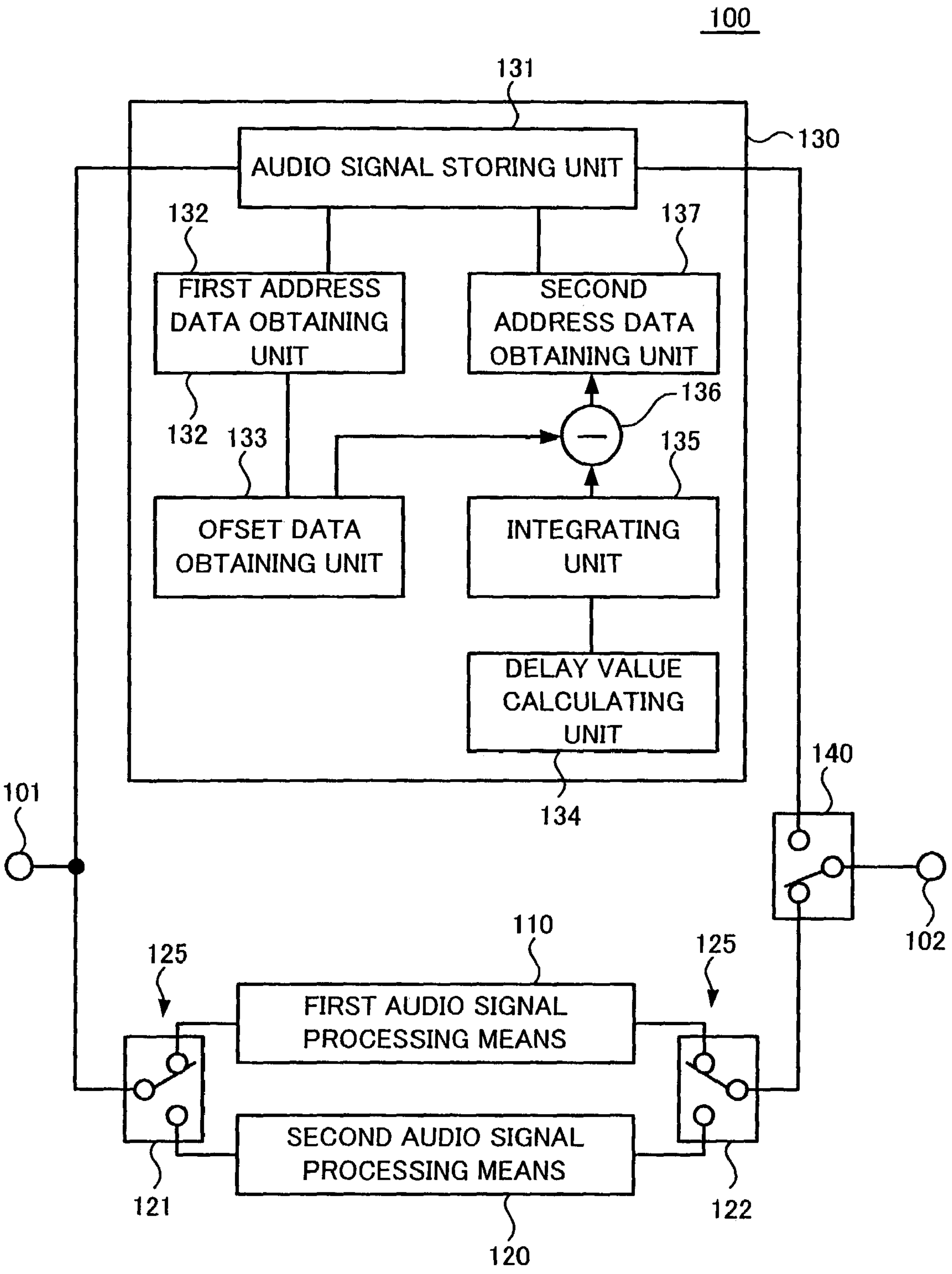
FIG. 1 is a block diagram of the first embodiment of the audio signal processing apparatus according to the present invention.

The preferred embodiments of the audio signal processing apparatus and the audio signal processing method according to the present invention will now be described with reference to FIGS. 1 to 9. Throughout the following detailed description, similar reference characters and numbers refer to respective similar elements in all figures of the drawings.

The constitution of the first embodiment of the audio signal processing apparatus 100 and the audio signal processing method according to the present invention will firstly be described hereinafter with reference to FIG. 1.

The audio signal processing apparatus 100 is shown in FIG. 1 as comprising an input terminal 101 having an audio signal inputted therein, first audio signal processing means 110 for processing the audio signal within a first process time, second audio signal processing means 120 for processing the audio signal within a second process time which is different from the first process time, an audio signal inputting unit 121 for having the audio signal selectively received by the first and second audio signal processing means 110 and 120, and an audio signal receiving unit 122 for selectively receiving the audio signals respectively processed by the first and second audio signal processing means 110 and 120. The audio signal inputting unit 121 and the audio signal receiving unit 122 are respectively constituted by switching devices.

The audio signal processing apparatus 100 further comprises audio signal delaying means 130 for receiving the audio signal from the input terminal 101, and delaying the audio signal in response to each of the first process time of the first audio signal processing means 110 and the second process time of the second audio signal processing means 120, audio signal outputting means 140 for selectively outputting the audio signal received from the audio signal receiving unit 122 and the audio signal received from the audio signal delaying means 130, and an output terminal 102 having the audio signal outputted therethrough.

The audio signal inputting unit 121 is operative to have the audio signal selectively received by the first and second audio signal processing means 110 and 120, while the audio signal receiving unit 122 is operative to selectively receive the audio signals respectively processed by the first and second audio signal processing means 110 and 120. The audio signal inputting unit 121 and the audio signal receiving unit 122 are collectively constitute selecting means 125 for allowing the audio signals respectively processed by the first and second audio signal processing means 110 and 120 to be selectively received by the audio signal outputting means 140.

The audio signal inputting unit 121 has an input terminals electrically connected to the input terminal 101, while the audio signal delaying means 130 has an input terminal electrically connected to the input terminal 101. The audio signal inputting unit 121 is operative to have the audio signal received by the audio signal delaying means 130, while the audio signal delaying means 130 is operative to receive the audio signal from the input terminal 121.

The first and second audio signal processing means 110 and 120 respectively have input terminals, while the audio signal inputting unit 121 also has a first output terminal electrically connected to the input terminal of one of the first and second audio signal processing means 110 and 120, and a second output terminal electrically connected to the input terminal of the other of the first and second audio signal processing means 110 and 120.

The first and second audio signal processing means 110 and 120 are respectively operative to process the audio signals received from the audio signal inputting unit 121, and output the processed audio signals to the audio signal receiving unit 122, while the audio signal receiving unit 122 is operative to selectively receive the audio signals respectively processed by the first and second audio signal processing means 110 and 120.

The first and second audio signal processing means 110 and 120 respectively have output terminals, while the audio signal receiving unit 122 has a first input terminal electrically connected to the output terminal of one of the first and second audio signal processing means 110 and 120, and a second input terminal electrically connected to the output terminal of the other of the first and second audio signal processing means 110 and 120. The audio signal receiving unit 122 is operative to selectively receive the audio signals respectively processed by the first and second audio signal processing means 110 and 120.

Although the audio signal processing apparatus 100 comprises first and second audio signal processing means 110 and 120 for each processing an audio signal, the audio signal processing apparatus 100 may comprise a plurality of audio signal processing means for each processing an audio signal. The audio signal inputting unit 121 and the audio signal receiving unit 122 may be respectively replaced by toggle switches, or attachable and removable terminals.

The audio signal delaying means 130 is operative to receive the audio signal from the exterior device through the input terminal 101, delay the audio signal in response to each of the first process time of the first audio signal processing means 110 and the second process time of the second audio signal processing means 120, and output the delayed audio signal to the audio signal outputting means 140.

The audio signal delaying means 130 includes an audio signal storing unit 131 for storing the audio signal therein, a first address data obtaining unit 132 for obtaining address data in association with the audio signal to be stored by the audio signal storing unit 131, an offset data obtaining unit 133 for obtaining offset data in association with the audio signal to be stored by the audio signal storing unit 131, a delay value calculating unit 134, an integrating unit 135, a subtracting unit 136, and a second address data obtaining unit 137 for obtaining address data in association with the audio signal to be outputted by the audio signal storing unit 131 to the audio signal receiving unit 122. The audio signal delaying means 130 may be realized by other constitutional elements.

The following description will now be directed to the constitution of the audio signal delaying means 130 forming part of the audio signal processing apparatus 100 according to the first embodiment of the present invention.

The audio signal storing unit 131 is operative to receive the audio signal from the exterior device through the input terminal 101 and the address data from the first address data obtaining unit 132, and store the audio signal received from the exterior device therein in response to the address data received from the first address data obtaining unit 132. Further, the audio signal storing unit 131 is operative to receive the address data from the second address data obtaining unit 137, and output the audio signal to the audio signal outputting means 140 in response to the address data received from the second address data obtaining unit 137.

The offset data obtaining unit 133 is operative to obtain an offset data to be incremented by the numerical value “1” in each process period, and output the offset data to the first address data obtaining unit 132 and the subtracting unit 136. The offset data is replaced by the numerical value “0” when the offset data incremented by the numerical value “1” is equal to, or larger than a predetermined maximum address data. The first address data obtaining unit 132 is operative to obtain address data in association with the audio signal to be stored by audio signal storing unit 131 based on the offset data obtained by the offset data obtaining unit 133, and output the address data to the audio signal storing unit 131.

The delay value calculating unit 134 is operative to calculate a process value based on each of the first process time of the first audio signal processing means 110 and the second process time of the second audio signal processing means 120, and output the calculated process value to the integrating unit 135. The process value is indicative of the process time divided by the predetermined process period.

Although the information with respect to the first process time of the first audio signal processing means 110 and the second process time of the second audio signal processing means 120 is previously stored by the delay value calculating unit 134, the delay value calculating unit 134 may be operative to receive the information with respect to the first process time of the first audio signal processing means 110 and the second process time of the second audio signal processing means 120 from an other exterior device.

The integrating unit 135 is operative to receive the information with respect to the process value from the delay value calculating unit 134, obtain an integrated delay value by integrating the process value received from the delay value calculating unit 134 along a time axis, and output the integrated delay value to the subtracting unit 136 in every predetermined period. Here, the integrated delay value to be outputted to the subtracting unit 136 is increased, or decreased in a monotone by integrating the delay value from an initial value to the process value along the time axis. The initial value is obtained from the integrated delay value outputted by the integrating unit 135 just before the new process value is received by the integrating unit 135. The decimals of the integrated delay value may be raised to the next whole number.

Figure 2:
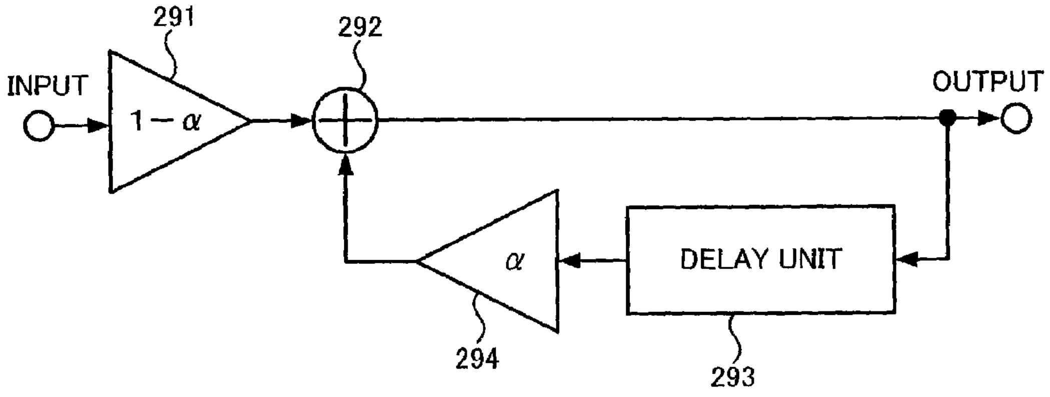
FIG. 2 is a block diagram of the integrating unit forming part of the first embodiment of the audio signal processing apparatus according to the present invention.

The integrating unit 135 is shown in FIG. 2 as including a first multiplying unit 291, an adding unit 292, a delay unit 293, and a second multiplying unit 294. The first multiplying unit 291 is operative to receive the information with respect to the process value from the delay value calculating unit 134, obtain a first multiplied value by multiplying a first constant value "1−α" by the process value received from the delay value calculating unit 134, and output the first multiplied value to the adding unit 292. The adding unit 292 is operative to receive the first multiplied value from the first multiplying unit 291 and the second multiplied value from the second multiplying unit 294, obtain an output value by adding the first multiplied value to the second multiplied value, and output the output value to the delay unit 293 and the subtracting unit 136.

The delay unit 293 is operative to receive the output value from the adding unit 292, obtain a delayed value by delaying the output value in response to a predetermined sampling period, and output the delayed value to the second multiplying unit 294. The second multiplying unit 294 is operative to revive the delayed value from the delay unit 293, obtain a second multiplied value by multiplying a second constant value "α" by the delayed value received from the delay unit 293, and output the second multiplied value to the adding unit 292. Here, the predetermined first constant value "1−α" and the predetermined second constant values "α" is as follows.

$$\text{the first constant value } "1-\alpha" + \text{the second constant value } "\alpha" = \text{the numerical value } "1"$$

Although the integrating unit 135 includes a first multiplying unit 291, an adding unit 292, a delay unit 293, and a second multiplying unit 294, the integrating unit 135 may be constituted by other constitutional elements.

The subtracting unit 136 is operative to receive the offset data from the offset data obtaining unit 133 and the output value from the integrating unit 135, obtain an address data by subtracting the output value from the offset data, and output the address data to the second address data obtaining unit 137. The second address data obtaining unit 137 is operative to receive the address data from the subtracting unit 136, obtain a signal in association with the audio signal to be outputted by audio signal storing unit 131 based on the address data received from the subtracting unit 136, and output the signal to the audio signal storing unit 131.

The audio signal outputting means 140 has a first input terminal electrically connected to the output terminal of the audio signal receiving unit 122, a second input terminal electrically connected to the output terminal of the audio signal delaying means 130, and an output terminal electrically connected to the output terminal 102. The audio signal outputting means 140 is operative to receive the processed audio signal from the audio signal receiving unit 122 and the delayed audio signal from the audio signal delaying means 130, and selectively output the processed audio signal received from the audio signal receiving unit 122 and the delayed audio signal received from the audio signal delaying means 130 to the exterior device through the output terminal 102.

The audio signal outputting means 140 is operative to output the delayed audio signal received from the audio signal delaying means 130 to the exterior device just before the audio signal to be outputted to the exterior device is switched from the audio signal processed by one of the first and second audio signal processing means 110 and 120 to the audio signal processed by the other of the first and second audio signal processing means 110 and 120. The audio signal outputting means 140 is operative to judge whether or not the delay time of the audio signal delayed by the audio signal delaying means 130 is equal in length to the process time of the audio signal processed by one of the first and second audio signal processing means 110 and 120 to be switched to the audio signal processed by the other of the first and second audio signal processing means 110 and 120 before outputting the delayed audio signal received from the audio signal delaying means 130 to the exterior device under the condition that the audio signal to be outputted to the exterior device is switched from the audio signal processed by one of the first and second audio signal processing means 110 and 120 to the audio signal processed by the other of the first and second audio signal processing means 110 and 120.

The audio signal outputting means 140 is operative to judge whether or not the delay time of the audio signal delayed by the audio signal delaying means 130 is equal in length to the process time of the audio signal processed by the other of the first and second audio signal processing means 110 and 120 switched from the audio signal processed by one of the first and second audio signal processing means 110 and 120 before outputting the audio signal processed by the other of the first and second audio signal processing means 110 and 120 under the condition that the audio signal to be outputted to the exterior device is switched from the audio signal processed by one of the first and second audio signal processing means 110 and 120 to the audio signal processed by the other of the first and second audio signal processing means 110 and 120.

The output terminal 102 is electrically connected to the output terminal of the audio signal outputting means 140, and electrically connected to the input terminal of the exterior device to have the audio signal received by the exterior device.

The audio signal processing method comprises a first audio signal processing step of processing an audio signal within a first process time, a second audio signal processing step of processing the audio signal within a second process time which is different from the first process time, an audio signal delaying step of delaying the audio signal in response to each of the first process time of the first audio signal processing means 110 and the second process time of the second audio signal processing means 120, an audio signal outputting step of selectively outputting the audio signals respectively processed by the first and second audio signal processing means 110 and 120 and the audio signal delayed by the audio signal delaying means 130, and a selecting step of allowing the audio signals respectively processed by the first and second audio signal processing means 110 and 120 to be selectively received by the audio signal outputting means 140.

The audio signal outputting step is of outputting the audio signal delayed by the audio signal delaying means 130 when the audio signal to be outputted in the audio signal outputting step is switched from the audio signal processed by one of the first and second audio signal processing means 110 and 120 to the audio signal processed by the other of the first and second audio signal processing means 110 and 120.

The following description will now be direct to the process to be performed by the first embodiment of the audio signal processing apparatus 100 according to the present invention.

Figure 3:
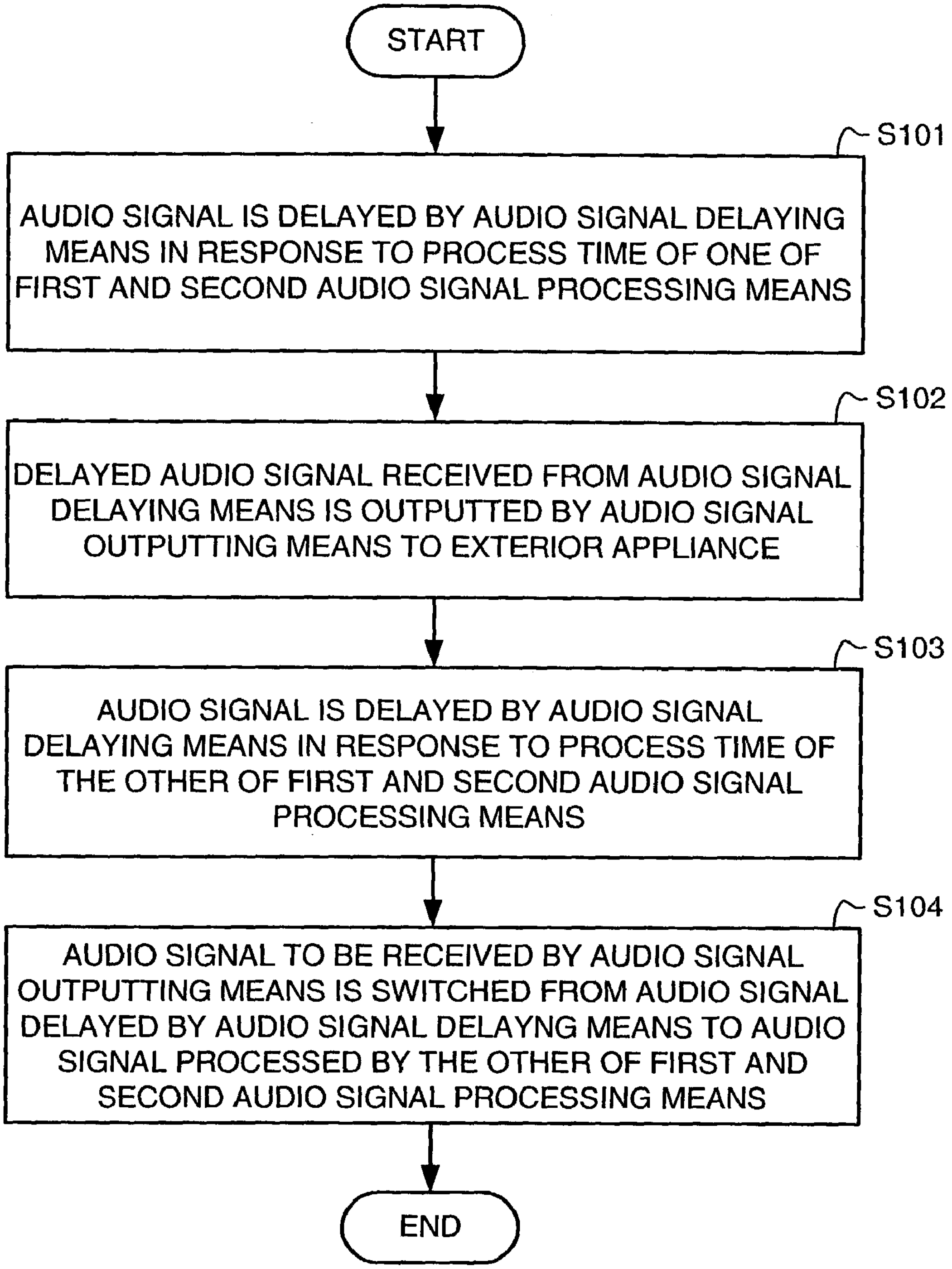
FIG. 3 is a flow chart showing a process to be performed by the first embodiment of the audio signal processing apparatus according to the present invention.

The following description will be directed to the case that the audio signal to be outputted to the exterior device is switched from the audio signal processed by the first audio signal processing means 110 to the audio signal processed by the second audio signal processing means 120 with reference to FIG. 3.

The audio signal is firstly processed within the first process time by the first audio signal processing means 110 in the selecting step, while the audio signal is delayed by the audio signal delaying means 130 in response to the first process time of the first audio signal processing means 110 in the audio signal delaying step.

The audio signal processed by the first audio signal processing means 110 and 120 is firstly outputted to the audio signal outputting means 140 by the audio signal receiving unit 122 in the audio signal outputting step (simply refer to as "step S101").

The audio signal to be received by the audio signal outputting means 140 is then switched from the processed audio signal outputted by the audio signal receiving unit 122 to the delayed audio signal outputted by the audio signal delaying means 130. The delayed audio signal received from the audio signal delaying means 130 is then outputted to the exterior device by the audio signal outputting means 140 in the step S102.

The delayed audio signal received from the audio signal delaying means 130 is then outputted to the exterior device through the output terminal 102 by the audio signal outputting means 140, while the audio signal received from the input terminal 101 is delayed by the audio signal delaying means 130 in response to the process time of the other of the first and second audio signal processing means 110 and 120 in the step S103.

The audio signal to be outputted by the audio signal outputting means 140 is then switched by the audio signal inputting unit 121 and the audio signal receiving unit 122 from the audio signal delayed by the audio signal delaying means 130 to the audio signal processed by the other of the first and second audio signal processing means 110 and 120 in the step S104.

The first embodiment of the audio signal processing apparatus 100 according to the present invention may be realized by a digital signal processor.

From the above detail description, it will be understood that the audio signal processing apparatus and the audio signal processing method according to the first embodiment of the present invention can have the audio signal continuously outputted to the exterior device without being instantaneously interrupted when the audio signal to be outputted to the exterior device is switched from the audio signal processed by one of the first and second audio signal processing units to the audio signal processed by the other of the first and second audio signal processing units.

The audio signal processing apparatus and the audio signal processing method according to the first embodiment of the present invention can reduce noises resulting from the signal difference between the audio signal processed by one of the first and second audio signal processing units and the audio signal processed by the other of the first and second audio signal processing units when the audio signal to be outputted to the exterior device is switched from the audio signal processed by one of the first and second audio signal processing units to the audio signal processed by the other of the first and second audio signal processing units.

Although there has been described in the above about the first embodiment of the audio signal processing apparatus and the audio signal processing method according to the present invention, this embodiment may be replaced by the second to seventh embodiments of the audio signal processing apparatus and the audio signal processing method according to the present invention in order to attain the objects of the present invention. The second to seventh embodiments of the audio signal processing apparatus and the audio signal processing method will then be described hereinafter.

The constitution of the second embodiment of the audio signal processing apparatus 200 and the audio signal processing method according to the present invention will firstly be described hereinafter with reference to FIG. 4.

Figure 4:
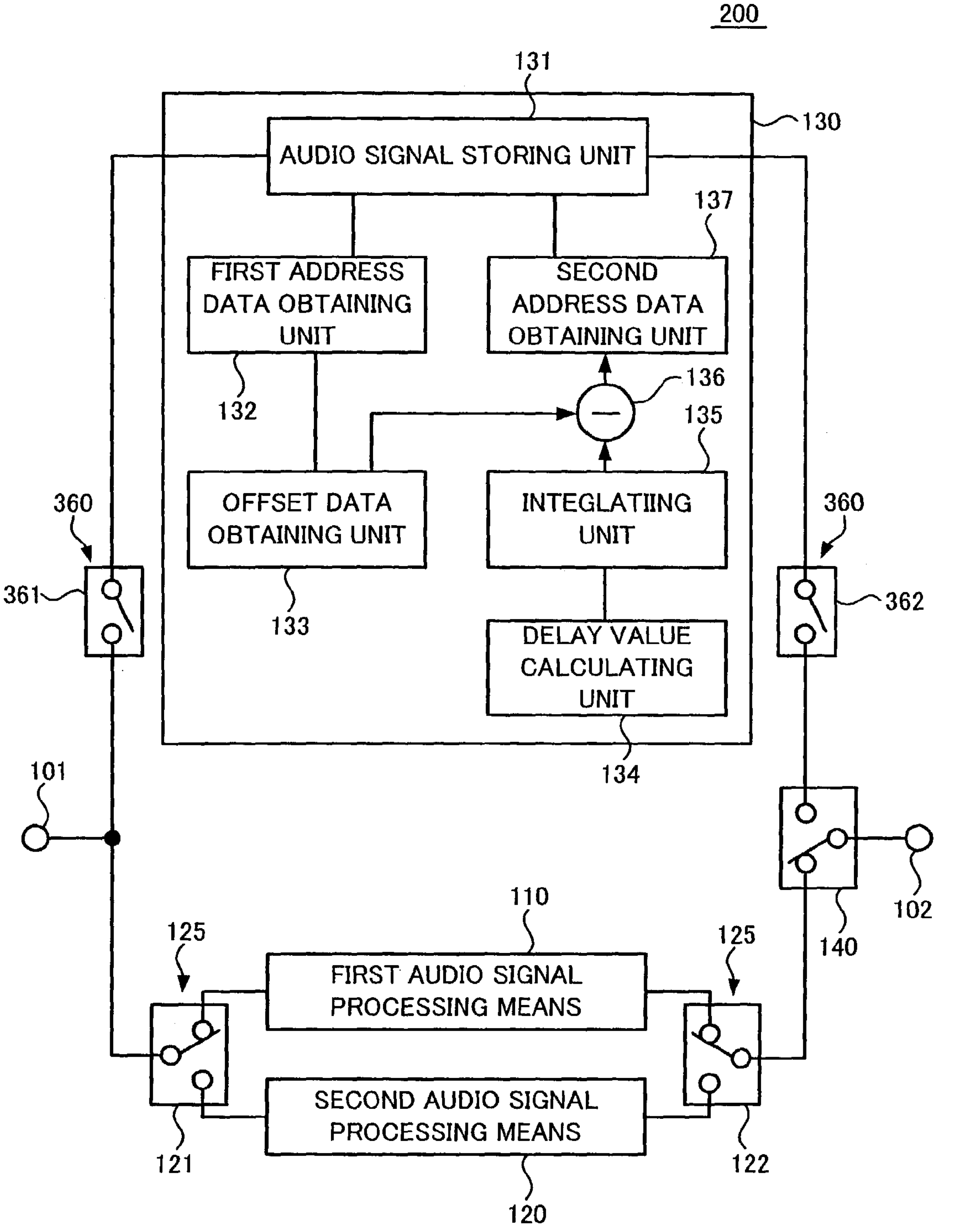
FIG. 4 is a block diagram of the second embodiment of the audio signal processing apparatus according to the present invention.

The audio signal processing apparatus 200 is shown in FIG. 4 as comprising an input terminal 101 having an audio signal inputted therein, first audio signal processing means 110 for processing the audio signal within a first process time, second audio signal processing means 120 for processing the audio signal within a second process time which is different from the first process time, audio signal inputting unit 121 for having the audio signal selectively received by the first and second audio signal processing means 110 and 120, and audio signal receiving unit 122 for selectively receiving the audio signals respectively processed by the first and second audio signal processing means 110 and 120.

The audio signal processing apparatus 200 further comprises audio signal delaying means 130 for receiving the audio signal from an exterior device through the input terminal 101, and delaying the audio signal in response to each of the first process time of the first audio signal processing means 110 and the second process time of the second audio signal processing means 120, audio signal outputting means 140 for selectively outputting the audio signal received from the audio signal receiving unit 122 and the audio signal received from the audio signal delaying means 130, and an output terminal 102 having the audio signal outputted therethrough.

The audio signal processing apparatus 200 further comprises a switching means 360 having the audio signal received by the audio signal delaying means 130, and allowing the audio signal delayed by the audio signal delaying means 130 to be received by the audio signal outputting means 140. The switching means 360 includes a first connecting unit 361 having a first terminal electrically connected to the input terminal 101 and a second terminal electrically connected to the input terminal of the audio signal delaying means 130, and a second connecting unit 362 having a first terminal electrically connected to the output terminal of the audio signal delaying means 130 and a second terminal electrically connected to the second input terminal of the audio signal delaying means 130.

The audio signal inputting unit 121 is operative to have the audio signal selectively received by the first and second audio signal processing means 110 and 120. The audio signal receiving unit 122 is operative to selectively receive the audio signals respectively processed by the first and second audio signal processing means 110 and 120. The audio signal inputting unit 121 and the audio signal receiving unit 122 are collectively constitute selecting means 125 for selectively outputting the audio signals respectively processed by the first and second audio signal processing means 110 and 120 to the audio signal outputting means 140.

The second embodiment of the audio signal processing apparatus 200 according to the present invention may be realized by a digital signal processor.

From the above detail description, it will be understood that the audio signal processing apparatus and the audio signal processing method according to the second embodiment of the present invention can have the audio signal continuously outputted to the exterior device without being instantaneously interrupted when the audio signal to be outputted to the exterior device is switched from the audio signal processed by one of the first and second audio signal processing units to the audio signal processed by the other of the first and second audio signal processing units.

The audio signal processing apparatus and the audio signal processing method according to the second embodiment of the present invention can reduce noises resulting from the signal difference between the audio signal processed by one of the first and second audio signal processing units and the audio signal processed by the other of the first and second audio signal processing units when the audio signal to be outputted to the exterior device is switched from the audio signal processed by one of the first and second audio signal processing units to the audio signal processed by the other of the first and second audio signal processing units.

The constitution of the third embodiment of the audio signal processing apparatus 300 and the audio signal processing method according to the present invention will firstly be described hereinafter with reference to FIG. 5.

Figure 5:
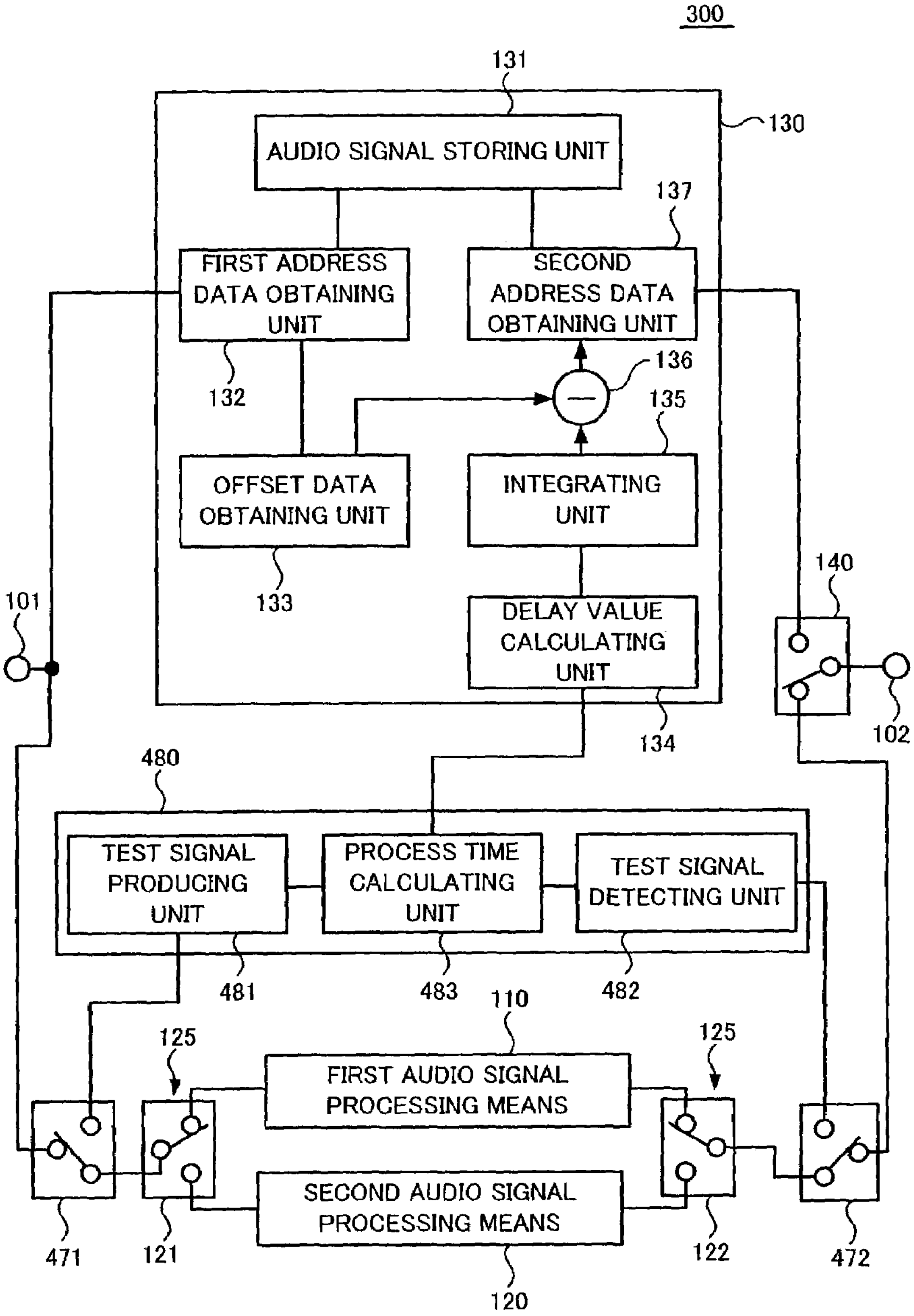
FIG. 5 is a block diagram of the third embodiment of the audio signal processing apparatus according to the present invention.

The audio signal processing apparatus 300 is shown in FIG. 5 as comprising an input terminal 101 having an audio signal inputted therein, first audio signal processing means 110 for processing the audio signal within a first process time, second audio signal processing means 120 for processing the audio signal within a second process time which is different from the first process time, audio signal inputting unit 121 for having the audio signal selectively received by the first and second audio signal processing means 110 and 120, and audio signal receiving unit 122 for selectively receiving the audio signals respectively processed by the first and second audio signal processing means 110 and 120.

The audio signal processing apparatus 300 further comprises audio signal delaying means 130 for receiving the audio signal from the input terminal 101, and delaying the audio signal in response to each of the first process time of the first audio signal processing means 110 and the second process time of the second audio signal processing means 120, audio signal outputting means 140 for selectively outputting the audio signal received from the audio signal receiving unit 122 and the audio signal received from the audio signal delaying means 130, and an output terminal 102 having the audio signal outputted therethrough.

The audio signal inputting unit 121 is operative to have the audio signal selectively received by the first and second audio signal processing means 110 and 120. The audio signal receiving unit 122 is operative to selectively receive the audio signals respectively processed by the first and second audio signal processing means 110 and 120. The audio signal inputting unit 121 and the audio signal receiving unit 122 are collectively constitute selecting means 125 for selectively outputting the audio signals respectively processed by the first and second audio signal processing means 110 and 120 to the audio signal outputting means 140.

The first switching circuit 471 has a first input terminal electrically connected to the input terminal 101, a second input terminal electrically connected to the output terminal of the process time calculating means 480, and an output terminal electrically connected to the input terminal of the audio signal inputting unit 121. The first switching circuit 471 is operative to selectively receive the audio signal from the input terminal 101 and the test signal from the process time calculating means 480. The first switching circuit 471 is operative to output the audio signal received from the input terminal 101 to the audio signal inputting unit 121.

On the other hand, the first switching circuit 471 is operative to output the test signal received from the process time calculating means 480 to the audio signal inputting unit 121 when the process time of each of the first and second audio signal processing means 110 and 120 is measured by the process time calculating means 480. The audio signal inputting unit 121 is operative to have the test signal selectively received by the first and second audio signal processing means 110 and 120.

The audio signal receiving unit 122 has a first input terminal electrically connected to the output terminal of the first audio signal processing means 110, a second input terminal electrically connected to the output terminal of the second audio signal processing means 120, and an output terminal. The second switching circuit 472 has an input terminal electrically connected to the output terminal of the audio signal receiving unit 122, a first output terminal electrically connected to the input terminal of the process time calculating means 480, and the second output terminal electrically connected to the input terminal of the audio signal outputting means 140.

The second switching circuit 472 is operative to output the audio signals processed by the first and second audio signal processing means 110 and 120 to the audio signal outputting means 140. On the other hand, the second switching circuit 472 is operative to output the test signals processed by the first and second audio signal processing means 110 and 120 to the process time calculating means 480 when the process time of each of the first and second audio signal processing means 110 and 120 is calculated by the process time calculating means 480.

The process time calculating means 480 is operative to output the test signal to the first and second audio signal processing means 110 and 120 through the first switching circuit 471 and the audio signal inputting unit 121, and receive the processed test signals from the first and second audio signal processing means 110 and 120 through the audio signal receiving unit 122 and the second switching circuit 472. Here, the processed test signals are respectively indicative of the test signals respectively processed by the first and second audio signal processing means 110 and 120.

The process time calculating means 480 is operative to calculate the first process time of the first audio signal processing means 110 and the second process time of the second audio signal processing means 120 based on the test signal and the processed test signal received from the first and second audio signal processing means 110 and 120. The term "process time" is intended to indicate a delay time of the processed test signal to the test signal.

The process time calculating means 480 includes a test signal producing unit 481, a test signal detecting unit 482, and a process time calculating unit 483. The test signal producing unit 481 is operative to produce a test signal, and output the test signal to the first and second audio signal processing means 110 and 120 through the first switching circuit 471 and the audio signal inputting unit 121, and output the test signal to the process time calculating unit 483. The second switching circuit 472 is operative to have the processed test signals received by the test signal detecting unit 482, while the test signal detecting means 482 is operative to detect the processed test signals respectively outputted by the first and second audio signal processing means 110 and 120.

The process time calculating unit 483 is operative to receive the processed test signal from the test signal detecting unit 482, and calculate the first process time of the first audio signal processing means 110 and the second process time of the second audio signal processing means 120 based on the test signal received from the test signal producing means 481 and the processed test signals received from the first and second audio signal processing means 110 and 120.

Although the process time calculating means 480 includes a test signal producing unit 481, a test signal detecting unit 482, and a process time calculating unit 483, the process time calculating means 480 may include a test signal producing unit 481, a test signal detecting unit 482, a process time calculating unit 483, a clock signal counting unit 484 (not shown in FIG. 5).

The test signal producing unit 481 is operative to produce a test signal, and output the test signal to each of the first and second audio signal processing means 110 and 120 through the first switching circuit 471 and the audio signal inputting unit 121, and simultaneously output the test signal to the process time calculating unit 483. The process time calculating unit 483 is operative to control the clock signal counting unit 484 to have the clock signal counting unit 484 start to count a number of the pulse of the clock signal, and to have the clock signal counting unit 484 stop counting a number of the pulse of the clock signal.

The following description will now be direct to the case that the first process time of the audio signal processing means 110 is calculated by the process time calculating unit 480.

The test signal is firstly produced and outputted to the first audio signal producing means 110 by the test signal producing unit 481 through the first switching circuit 471 and the audio signal inputting unit 121, and simultaneously outputted to the process time calculating unit 483. The test signal produced by the test signal producing unit 481 is then received by the first audio signal processing means 110, and processed and outputted to the process time calculating unit 483 through the second switching circuit 472. The time difference between the test signal processed by the audio signal processing means 110 and the test signal received from the test signal producing unit 481 is calculated by the process time calculating unit 483 in response to the number of the pulses counted by the clock signal counting unit 484. The process time is finally obtained by the process time calculating unit 483 based on the calculated time difference between the test signal processed by the audio signal processing means 110 and the test signal received from the test signal producing unit 481.

The third embodiment of the audio signal processing apparatus 300 according to the present invention may be realized by a digital signal processor.

From the above detail description, it will be understood that the audio signal processing apparatus and the audio signal processing method according to the third embodiment of the present invention can have the audio signal continuously outputted to the exterior device without being instantaneously interrupted when the audio signal to be outputted to the exterior device is switched from the audio signal processed by one of the first and second audio signal processing units to the audio signal processed by the other of the first and second audio signal processing units.

The audio signal processing apparatus and the audio signal processing method according to the third embodiment of the present invention can reduce noises resulting from the signal difference between the audio signal processed by one of the first and second audio signal processing units and the audio signal processed by the other of the first and second audio signal processing units when the audio signal to be outputted to the exterior device is switched from the audio signal processed by one of the first and second audio signal processing units to the audio signal processed by the other of the first and second audio signal processing units.

The constitution of the fourth embodiment of the audio signal processing apparatus 400 according to the present invention will firstly be described hereinafter with reference to FIG. 6.

Figure 6:
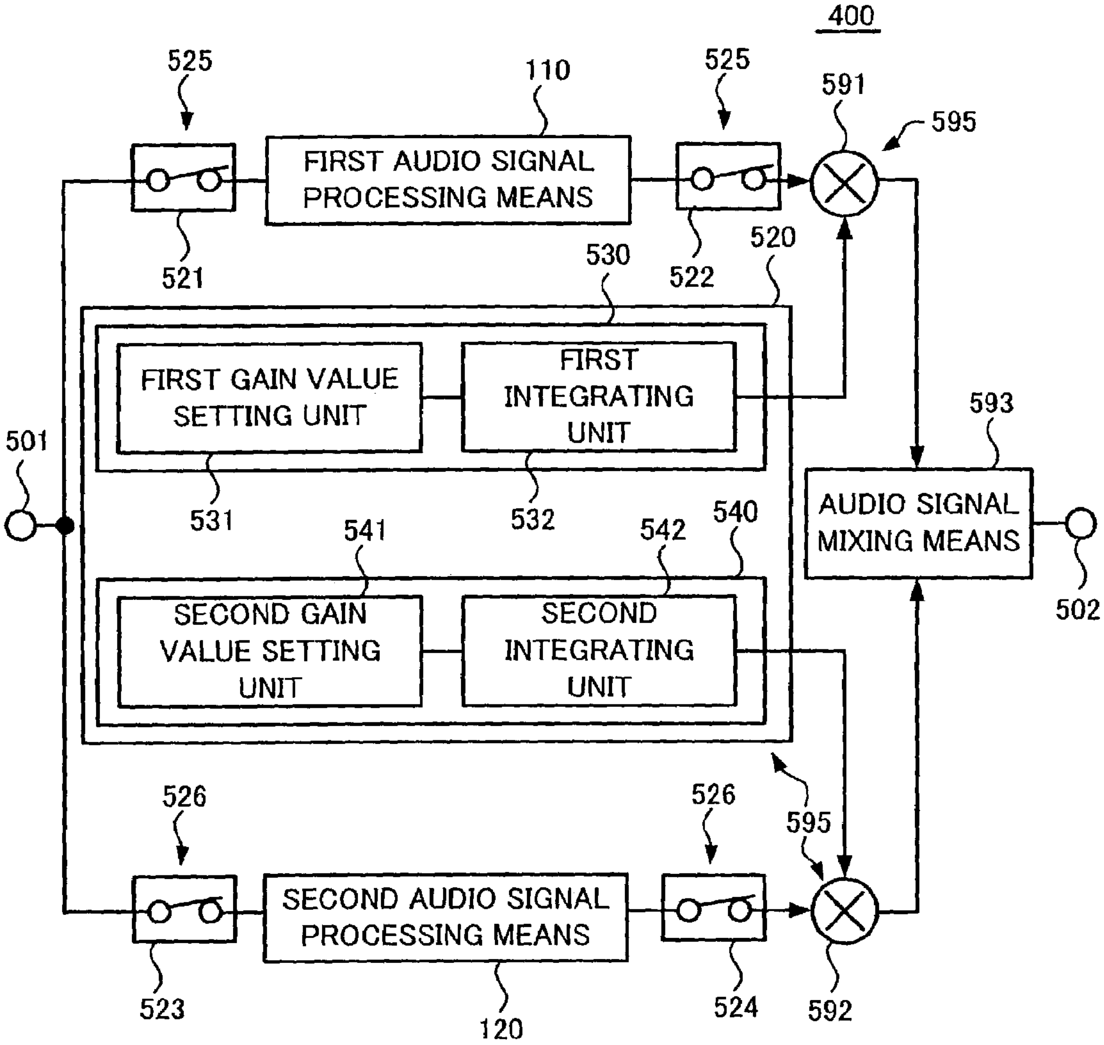
FIG. 6 is a block diagram of the fourth embodiment of the audio signal processing apparatus according to the present invention.

The audio signal processing apparatus 400 is shown in FIG. 6 as comprising an input terminal 501 having an audio signal inputted therein, the audio signal having a signal level, first audio signal processing means 110 for processing the audio signal within a first process time, second audio signal processing means 120 for processing the audio signal within a second process time which is different from the first process time, first multiplying means 591 for multiplying the audio signal processed by the first audio signal processing means 110 by a first attenuation factor, second multiplying means 592 for multiplying the audio signal processed by the second audio signal processing means 120 by a second attenuation factor, and attenuation factor calculating means 520 for calculating the first and second attenuation factors.

The audio signal processing apparatus 400 further comprises first switching circuit 521 having the audio signal received by the first audio signal processing means 110, second switching circuit 522 having the audio signal received by the first multiplying means 591, third switching circuit 523 having the audio signal received by the second audio signal processing means 120, fourth switching circuit 524 having the audio signal received by the second multiplying means 592, audio signal mixing means 593 for mixing the audio signal received from the first multiplying means 591 with the audio signal received from the second multiplying means 592, and an output terminal 502 having the audio signal outputted therethrough.

The first switching circuit 521 and the second switching circuit 522 collectively constitute first selecting means, while the third switching circuit 523 and the fourth switching circuit 524 collectively constitute second selecting means. The first selecting means is operative to input the audio signal to the first audio signal processing means 110, and output the audio signal processed by the first audio signal processing means 110 to the first multiplying means 591, while the second selecting means is operative to input the audio signal to the second audio signal processing means 120, and output the audio signal processed by the second audio signal processing means 120 to the second multiplying means 592.

The attenuation factor calculating means 520, the first multiplying means 591, and the second multiplying means 592 collectively constitute signal level changing means 595 for attenuating the signal level of the audio signal processed by the first audio signal processing means 110, and outputting the attenuated audio signal to the audio signal mixing means 593 before outputting the audio signal processed by the second audio signal processing means 120 to the audio signal mixing means 593 when the audio signal to be received by the audio signal mixing means 593 is switched by the first and second selecting means 525 and 526 from the audio signal processed by the first audio signal processing means 110 to the audio signal processed by the second audio signal processing means 120.

On the other hand, the signal level changing means 595 is operative to restore the attenuated audio signal to the audio signal processed by the first audio signal processing means 110 after attenuating the audio signal processed by the second audio signal processing means 120, and outputting the attenuated audio signal to the audio signal mixing means 593 when the audio signal to be received by the audio signal mixing means 593 is switched by the first and second selecting means 525 and 526 from the audio signal processed by the second audio signal processing means 120 to the audio signal processed by the first audio signal processing means 110.

Here, the first and second attenuation factors are respectively indicative of values to be multiplied by the signal levels of the audio signals received by the first and second multiplying means 591 and 592.

The input terminal 501 has the audio signal inputted therein, while the first switching circuit 521 has an input terminal electrically connected to the input terminal 501 to receive the audio signal from the exterior device through the input terminal 501. The third switching circuit 523 has an input terminal electrically connected to the input terminal 501 to receive the audio signal from the exterior device through the input terminal 501.

The first switching circuit 521 has an output terminal, while the first audio signal processing means 110 has an input terminal electrically connected to the output terminal of the first switching circuit 521 to receive the audio signal from the first switching circuit 521. The third switching circuit 523 has an output terminal, while the second audio signal processing means 120 has an input terminal electrically connected to the output terminal of the third switching circuit 523 to receive the audio signal from the third switching circuit 523.

The first audio signal processing means 110 is operative to receive the audio signal from the first switching circuit 521, process the audio signal received from the first switching circuit 521, and output the processed audio signal to the second switching circuit 522. The second switching circuit 522 has an input terminal electrically connected to the output terminal of the first audio signal processing means 110 to receive the processed audio signal from the first audio signal processing means 110, and output the processed audio signal to the first multiplying means 591.

The first switching circuit 521 and the second switching circuit 522 may be respectively replaced by toggle switches, or attachable and removable terminals. The second switching circuit 522 has an input terminal, while the first audio signal processing means 110 has an input terminal electrically connected to the input terminal of the second switching circuit 522 to output the processed audio signal from the second switching circuit 522. The fourth switching circuit 524 has an input terminal, while the second audio signal processing means 120 has an output terminal electrically connected to the input terminal of the fourth switching circuit 524 to output the processed audio signal from the fourth switching circuit 524.

The second audio signal processing means 120 is operative to receive the audio signal from the third switching circuit 523, process the audio signal received from the third switching circuit 523, and output the processed audio signal to the fourth switching circuit 524.

The fourth switching circuit 524 has an input terminal electrically connected to the output terminal of the second audio signal processing means 120 to receive the processed audio signal from the second audio signal processing means 120, and output the processed audio signal to the second multiplying means 592. The third switching circuit 523 and the fourth switching circuit 524 may be respectively replaced by toggle switches, or attachable and removable terminals.

The attenuation factor calculating means 520 is operative to calculate a first attenuation factor to affect the processed audio signal outputted by the second switching circuit 522, and calculate a second attenuation factor to affect the processed audio signal outputted by the fourth switching circuit 524. Here, the first and second attenuation factors are respectively calculated by the attenuation factor calculating means 520 based on the audio signal requested by the exterior device. The numerical value "1" as the first attenuation factor is calculated and outputted by the attenuation factor calculating means 520 to the first multiplying means 591 under the condition that the audio signal processed by the first audio signal processing means 110 is requested by the exterior device. On the other hand, the numerical value "0" as the first attenuation factor is calculated and outputted by the attenuation factor calculating means 520 to the first multiplying means 591 under the condition that the audio signal processed by the second audio signal processing means 120 is requested by the exterior device.

The numerical value "0" as the second attenuation factor is calculated and outputted by the attenuation factor calculating means 520 to the second multiplying means 592 under the condition that the audio signal processed by the first audio signal processing means 110 is requested by the exterior device. On the other hand, the numerical value "1" as the second attenuation factor is calculated and outputted by the attenuation factor calculating means 520 to the second multiplying means 592 under the condition that the audio signal processed by the second audio signal processing means 110 is requested by the exterior device.

The attenuation factor calculating means 520 includes a first attenuation factor adjusting unit 530 and a second attenuation factor adjusting unit 540. The first attenuation factor adjusting unit 530 includes a first gain value setting unit 531 and a first integrating unit 532, while the second attenuation factor adjusting unit 540 includes a second gain value setting unit 541 and a second integrating unit 542.

The first gain value setting unit 531 is operative to output a numerical value "1" as a first gain value to the first integrating unit 532 under the condition that the audio signal processed by the first audio signal processing means 110 is requested by the exterior device. On the other hand, the first gain value setting unit 531 is operative to output a numerical value "0" as the first gain value to the first integrating unit 532 under the condition that the audio signal processed by the second audio signal processing means 120 is requested by the exterior device.

The first integrating unit 532 is operative to receive the first gain value from the first gain value outputting means 531, calculate the first attenuation factor based on the first gain value and a first accumulation value, output the first attenuation factor to the first multiplying means 591 in each process period. Here, the first accumulation value is obtained by the first integrating unit 532 from the first attenuation factor calculated in a process period just before a current process period. The first integrating unit 532 is operative to update and output the first attenuation factor to the first multiplying means 591 in each process period, and gradually bring the first attenuation factor to the gain value within the predetermined period to finally obtain the attenuation factor which is equal to the gain value.

The second gain value setting unit 541 is operative to output a numerical value "0" as a second gain value to the second integrating unit 542 under the condition that the audio signal processed by the first audio signal processing means 110 is requested by the exterior device. On the other hand, the second gain value setting unit 541 is operative to output a numerical value "1" as the second gain value to the second integrating unit 542 under the condition that the audio signal processed by the second audio signal processing means 120 is requested by the exterior device.

The second integrating unit 542 is operative to receive the second gain value from the second gain value outputting means 541, calculate the second attenuation factor based on the first gain value and a second accumulation value, output the second attenuation factor to the second multiplying means 592 in each process period. Here, the second accumulation value is obtained by the second integrating unit 542 from the second attenuation factor calculated in a process period just before a current process period. The second integrating unit 542 is operative to update and output the second attenuation factor to the second multiplying means 592 in each process period, and gradually bring the second attenuation factor to the gain value within the predetermined period.

The first multiplying means 591 is operative to receive the processed audio signal from the first audio signal processing means 110 and the first attenuation factor from the attenuation factor calculating means 520, multiply the first attenuation factor by the signal level of the processed audio signal, and output the processed audio signal multiplied by the first attenuation factor to the audio signal mixing means 593. Here, the audio signal having the signal level "0" is outputted to the audio signal mixing means 593 under the condition that the numerical value "0" as the first attenuation factor is multiplied by the signal level of the processed audio signal by the first multiplying means 591. On the other hand, the processed audio signal received from the first audio signal processing means 110 is outputted to the audio signal mixing means 593 under the condition that the numerical value "1" as the first attenuation factor is multiplied by the signal level of the processed audio signal by the first multiplying means 591.

The second multiplying means 592 is operative to receive the processed audio signal from the second audio signal processing means 120 and the second attenuation factor from the attenuation factor calculating means 520, multiply the second attenuation factor by the signal level of the processed audio signal, and output the processed audio signal multiplied by the second attenuation factor to the audio signal mixing means 593. Here, the audio signal having the signal level "0" is outputted to the audio signal mixing means 593 under the condition that the numerical value "0" as the second attenuation factor is multiplied by the signal level of the processed audio signal by the second multiplying means 592. On the other hand, the processed audio signal received from the second audio signal processing means 120 is outputted to the audio signal mixing means 593 under the condition that the numerical value "1" as the second attenuation factor is multiplied by the signal level of the processed audio signal by the second multiplying means 592.

The audio signal mixing means 593 is operative to receive the audio signal from the first multiplying means 591 and the audio signal from the second multiplying means 592, mix the audio signal received from the first multiplying means 591 with the audio signal received from the second multiplying means 592, and output the mixed audio signal to the exterior device through the output terminal 502. The output terminal 502 having the mixed audio signal outputted therethrough.

The audio signal processing method comprises a first audio signal processing step of processing an audio signal having a signal level, a second audio signal processing step of processing the audio signal, a first selecting step of allowing the audio signal to be received and processed by one of the first and second audio signal processing means 110 and 120, a second selecting step of allowing the audio signal to be received and processed by the other of the first and second audio signal processing means 110 and 120, a signal level changing step of selectively attenuating the audio signals respectively processed by the first and second audio signal processing means 110 and 120 when the audio signal to be outputted to an exterior device is switched from the audio signal processed by one of the first and second audio signal processing means 110 and 120 to the audio signal processed by the other of the first and second audio signal processing means 110 and 120, and audio signal mixing step of mixing and outputting the audio signals received from the signal level changing means 595.

The following description will then be directed to the case that the audio signal to be outputted to the exterior device is switched from the audio signal processed by the first audio signal processing means 110 to the audio signal processed by the second audio signal processing means 120.

The numerical value "0" as the first gain value is firstly outputted by the first gain value setting unit 531 to the first integrating unit 532, while the numerical value "1" as the second gain value is outputted by the second gain value setting unit 541 to the second integrating unit 542 under the condition that the audio signal processed by the second audio signal processing means 120 is requested by the exterior device in the step S2.

The first attenuation value is gradually decreased by the first integrating unit 532, and outputted to the first multiplying means 591 in each process period in the step S3. The second attenuation value is gradually increased by the second integrating unit 542, and outputted to the second multiplying means 592 in each process period in the step S4. The signal level of the audio signal processed by the first audio signal processing means 110 is multiplied by the first attenuation value outputted by the first integrating unit 532 in the step S5. The signal level of the audio signal processed by the second audio signal processing means 120 is multiplied by the second attenuation value outputted by the second integrating unit 542 in the step S6. The fourth embodiment of the audio signal processing apparatus 400 according to the present invention may be realized by a digital signal processor.

From the above detail description, it will be understood that the audio signal processing apparatus and the audio signal processing method according to the fourth embodiment of the present invention can have the audio signal continuously outputted to the exterior device without being instantaneously interrupted when the audio signal to be outputted to the exterior device is switched from the audio signal processed by one of the first and second audio signal processing units to the audio signal processed by the other of the first and second audio signal processing units.

The audio signal processing apparatus and the audio signal processing method according to the fourth embodiment of the present invention can reduce noises resulting from the signal difference between the audio signal processed by one of the first and second audio signal processing units and the audio signal processed by the other of the first and second audio signal processing units when the audio signal to be outputted to the exterior device is switched from the audio signal processed by one of the first and second audio signal processing units to the audio signal processed by the other of the first and second audio signal processing units.

The constitution of the fifth embodiment of the audio signal processing apparatus 500 according to the present invention will firstly be described hereinafter with reference to FIG. 7.

Figure 7:
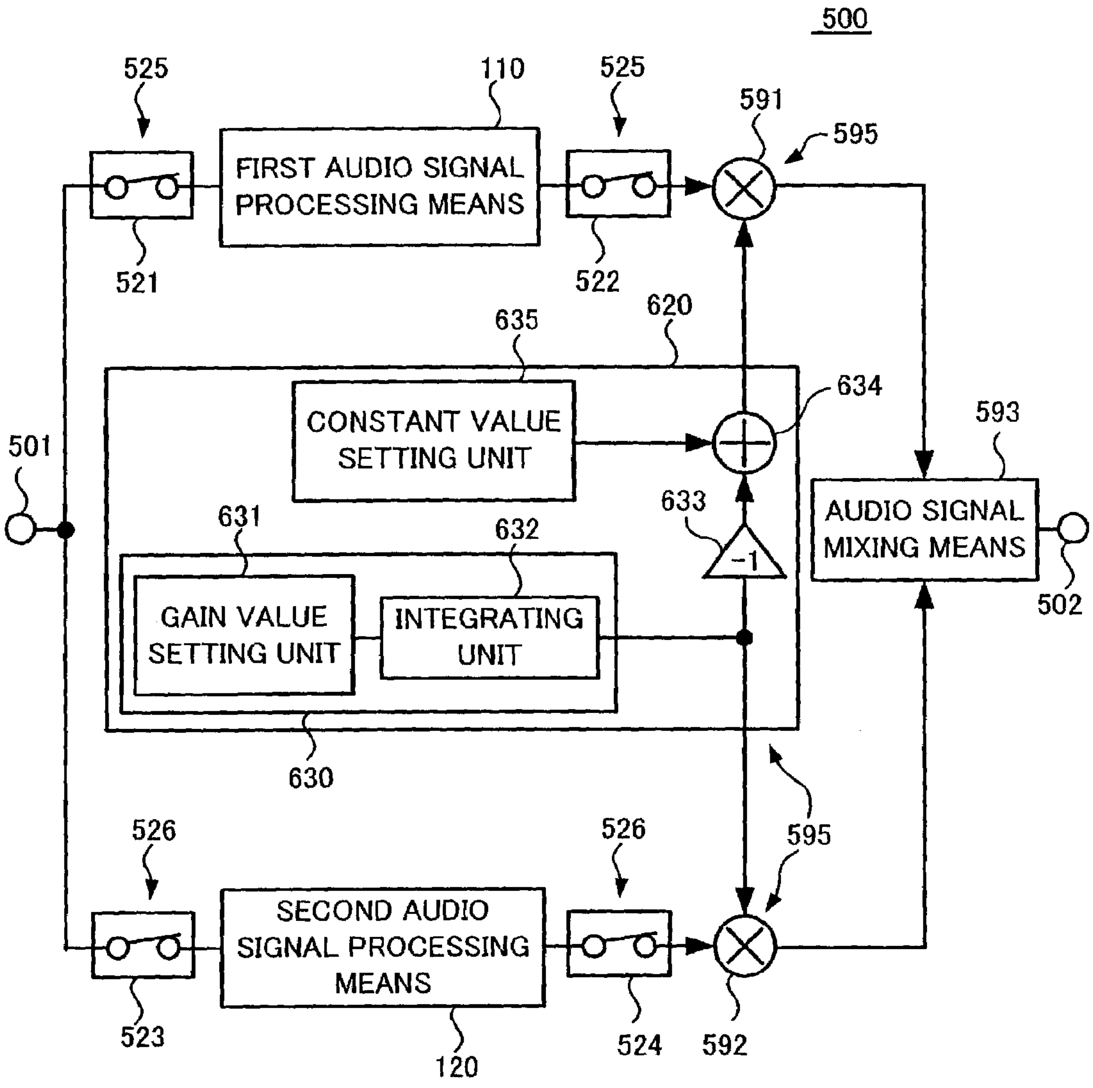
FIG. 7 is a block diagram of the fifth embodiment of the audio signal processing apparatus according to the present invention.

The audio signal processing apparatus 500 is shown in FIG. 7 as comprising an input terminal 501 having an audio signal inputted therein, the audio signal having a signal level, first audio signal processing means 110 for processing the audio signal within a first process time, second audio signal processing means 120 for processing the audio signal within a second process time which is different from the first process time, first multiplying means 591 for multiplying the audio signal processed by the first audio signal processing means 110 by a first attenuation factor, second multiplying means 592 for multiplying the audio signal processed by the second audio signal processing means 120 by a second attenuation factor, and attenuation factor calculating means 620 for calculating the first and second attenuation factors.

The audio signal processing apparatus 500 further comprises first switching circuit 521 having the audio signal received by the first audio signal processing means 110, second switching circuit 522 having the audio signal received by the first multiplying means 591, third switching circuit 523 having the audio signal received by the second audio signal processing means 120, fourth switching circuit 524 having the audio signal received by the second multiplying means 592, audio signal mixing means 593 for mixing the audio signal received from the first multiplying means 591 with the audio signal received from the second multiplying means 592, and an output terminal 502 having the audio signal outputted therethrough. The first switching circuit 521 and the second switching circuit 522 respectively functions as first switching means 521 and second switching means 522. The third switching circuit 523 and the fourth switching circuit 524 respectively functions as third switching means 523 and fourth switching means 524.

The first switching circuit 521 and the second switching circuit 522 collectively constitute first selecting means, while the third switching circuit 523 and the fourth switching circuit 524 collectively constitute second selecting means. The first selecting means is operative to input the audio signal to the first audio signal processing means 110, and output the audio signal processed by the first audio signal processing means 110 to the first multiplying means 591, while the second selecting means is operative to input the audio signal to the second audio signal processing means 120, and output the audio signal processed by the second audio signal processing means 120 to the second multiplying means 592. Here, the processed audio signal is indicative of the audio signal processed by any one of the first and second audio signal processing means 110 and 120. The first and second attenuation factor are respectively values to be multiplied by the signal levels of the audio signals received by the first and second multiplying means 591 and 592.

The attenuation factor calculating means 620, the first multiplying means 591, and the second multiplying means 592 collectively constitute signal level changing means 595 for attenuating the signal level of the audio signal processed by the first audio signal processing means 110, and outputting the attenuated audio signal to the audio signal mixing means 593 before outputting the audio signal processed by the second audio signal processing means 120 to the audio signal mixing means 593 when the audio signal to be received by the audio signal mixing means 593 is switched by the first and second selecting means 525 and 526 from the audio signal processed by the first audio signal processing means 110 to the audio signal processed by the second audio signal processing means 120.

On the other hand, the signal level changing means 595 is operative to restore the attenuated audio signal to the audio signal processed by the first audio signal processing means 110 after attenuating the audio signal processed by the second audio signal processing means 120, and outputting the attenuated audio signal to the audio signal mixing means 593 when the audio signal to be received by the audio signal mixing means 593 is switched by the first and second selecting means 525 and 526 from the audio signal processed by the second audio signal processing means 120 to the audio signal processed by the first audio signal processing means 110.

Here, the first and second attenuation factors are respectively indicative of values to be multiplied by the signal levels of the audio signals received by the first and second multiplying means 591 and 592.

The attenuation factor calculating means 620 is operative to calculate a first attenuation factor to affect the processed audio signal outputted by the second switching circuit 522, and calculate a second attenuation factor to affect the processed audio signal outputted by the fourth switching circuit 524. Here, the first and second attenuation factors are calculated by the attenuation factor calculating means 620 based on the processed audio signal requested by the exterior device. The numerical value "1" as the first attenuation factor is calculated and outputted to the first multiplying means 591 under the condition that the audio signal processed by the first audio signal processing means 110 is requested by the exterior device. On the other hand, the numerical value "0" as the first attenuation factor is calculated and outputted to the first multiplying means 591 under the condition that the audio signal processed by the second audio signal processing means 120 is requested by the exterior device.

The numerical value "1" as the second attenuation factor is calculated and outputted to the first multiplying means 591 under the condition that the audio signal processed by the first audio signal processing means 110 is requested by the exterior device. On the other hand, the numerical value "0" as the second attenuation factor is calculated and outputted to the first multiplying means 591 under the condition that the audio signal processed by the second audio signal processing means 120 is requested by the exterior device.

The attenuation factor calculating means 620 includes an attenuation factor adjusting unit 630, an inverting unit 633, an adding unit 634, and a constant value setting unit 635. The attenuation factor adjusting unit 630 includes a gain value setting unit 631 and an integrating unit 632.

The gain value setting unit 631 is operative to output a numerical value "1" as a gain value to the integrating unit 632 under the condition that the audio signal processed by the first audio signal processing means 110 is requested by the exterior device. On the other hand, the gain value setting unit 631 is operative to output a numerical value "0" as the gain value to the integrating unit 632 under the condition that the audio signal processed by the second audio signal processing means 120 is requested by the exterior device.

The integrating unit 632 is operative to receive the gain value from the gain value setting unit 631, calculate the second attenuation factor based on the gain value and an accumulation value, output the second attenuation factor to the second multiplying means 592 in a current process period. Here, the second accumulation value is obtained by the integrating unit 632 from the attenuation factor calculated in a process period just before a current process period. The integrating unit 632 is operative to update and output the first attenuation factor to the first multiplying means 591 in each process period, and gradually bring the first attenuation factor to the gain value within the predetermined period.

The inverting unit 633 is operative to receive the second attenuation factor from the attenuation factor adjusting unit 630, invert a sign of the second attenuation factor, and output the inverted second attenuation factor to the adding unit 634. The constant value setting unit 635 is operative to output a predetermined constant value "1" to the adding unit 634, while the adding unit 634 is operative to receive the predetermined constant value "1" from the constant value setting unit 635 and the inverted attenuation factor from the inverting unit 633, calculate a first attenuation factor by adding the predetermined constant value "1" to the inverted second attenuation factor, and outputting the first attenuation factor to the first multiplying means 591. This leads to the fact that the constant value "1" is obtained by adding the first attenuation factor to the second attenuation factor. The fifth embodiment of the audio signal processing apparatus 500 according to the present invention may be realized by a digital signal processor.

From the above detail description, it will be understood that the audio signal processing apparatus and the audio signal processing method according to the fifth embodiment of the present invention can have the audio signal continuously outputted to the exterior device without being instantaneously interrupted when the audio signal to be outputted to the exterior device is switched from the audio signal processed by one of the first and second audio signal processing units to the audio signal processed by the other of the first and second audio signal processing units. The audio signal processing apparatus and the audio signal processing method according to the firth embodiment of the present invention can reduce noises resulting from the signal difference between the audio signal processed by one of the first and second audio signal processing units and the audio signal processed by the other of the first and second audio signal processing units when the audio signal to be outputted to the exterior device is switched from the audio signal processed by one of the first and second audio signal processing units to the audio signal processed by the other of the first and second audio signal processing units.

The constitution of the sixth embodiment of the audio signal processing apparatus 600 according to the present invention will firstly be described hereinafter with reference to FIG. 8.

Figure 8:
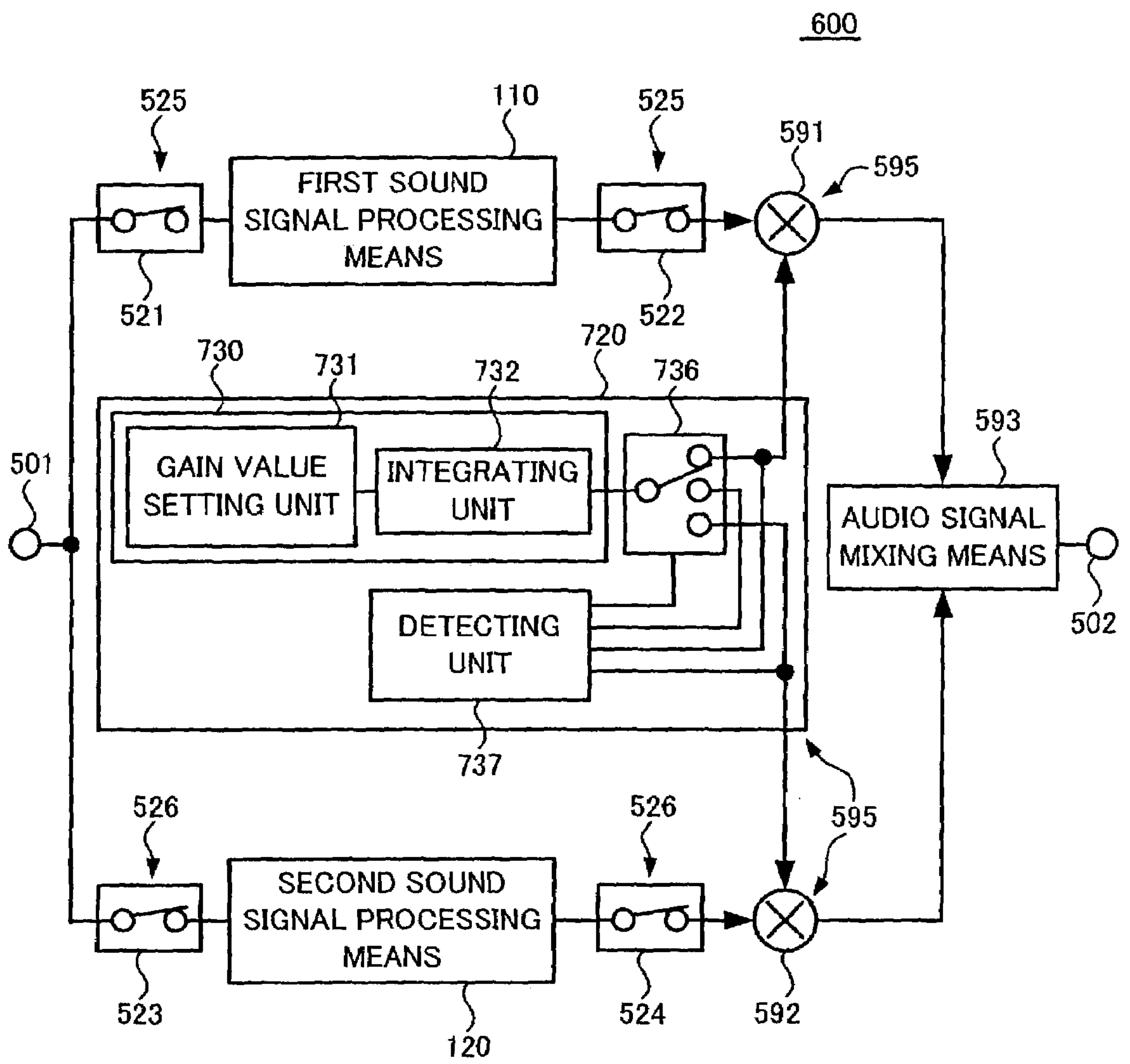
FIG. 8 is a block diagram of the sixth embodiment of the audio signal processing apparatus according to the present invention.

The audio signal processing apparatus 600 is shown in FIG. 8 as comprising an input terminal 501 having an audio signal inputted therein, the audio signal having a signal level, first audio signal processing means 110 for processing the audio signal within a first process time, second audio signal processing means 120 for processing the audio signal within a second process time which is different from the first process time, first multiplying means 591 for multiplying the audio signal processed by the first audio signal processing means 110 by a first attenuation factor, second multiplying means 592 for multiplying the audio signal processed by the second audio signal processing means 120 by a second attenuation factor, and attenuation factor calculating means 720 for calculating the first and second attenuation factors.

The audio signal processing apparatus 600 further comprises first switching circuit 521 having the audio signal received by the first audio signal processing means 110, second switching circuit 522 having the audio signal received by the first multiplying means 591, third switching circuit 523 having the audio signal received by the second audio signal processing means 120, fourth switching circuit 524 having the audio signal received by the second multiplying means 592, audio signal mixing means 593 for mixing the audio signal received from the first multiplying means 591 with the audio signal received from the second multiplying means 592, and an output terminal 502 having the audio signal outputted therethrough.

The first switching circuit 521 and the second switching circuit 522 collectively constitute first selecting means 525, while the third switching circuit 523 and the fourth switching circuit 524 collectively constitute second selecting means 526. The first selecting means 525 is operative to input the audio signal to the first audio signal processing means 110, and output the audio signal processed by the first audio signal processing means 110 to the first multiplying means 591, while the second selecting means 526 is operative to input the audio signal to the second audio signal processing means 120, and output the audio signal processed by the second audio signal processing means 120 to the second multiplying means 592.

The attenuation factor calculating means 720, the first multiplying means 591, and the second multiplying means 592 collectively constitute signal level changing means 595 for attenuating the signal level of the audio signal processed by the first audio signal processing means 110, and outputting the attenuated audio signal to the audio signal mixing means 593 before outputting the audio signal processed by the second audio signal processing means 120 to the audio signal mixing means 593 when the audio signal to be received by the audio signal mixing means 593 is switched by the first and second selecting means 525 and 526 from the audio signal processed by the first audio signal processing means 110 to the audio signal processed by the second audio signal processing means 120.

On the other hand, the signal level changing means 595 is operative to restore the attenuated audio signal to the audio signal processed by the first audio signal processing means 110 after attenuating the audio signal processed by the second audio signal processing means 120, and outputting the attenuated audio signal to the audio signal mixing means 593 when the audio signal to be received by the audio signal mixing means 593 is switched by the first and second selecting means 525 and 526 from the audio signal processed by the second audio signal processing means 120 to the audio signal processed by the first audio signal processing means 110.

Here, the first and second attenuation factors are respectively indicative of values to be multiplied by the signal levels of the audio signals received by the first and second multiplying means 591 and 592.

The attenuation factor calculating means 720 is operative to calculate a first attenuation factor to affect the processed audio signal outputted by the second switching circuit 522, and calculate a second attenuation factor to affect the processed audio signal outputted by the fourth switching circuit 524.

Here, the first and second attenuation factors are calculated by the attenuation factor calculating means 720 based on the audio signal requested by the exterior device. The numerical value "1" as the first attenuation factor is calculated and outputted to the first multiplying means 591 under the condition that the audio signal processed by the first audio signal processing means 110 is requested by the exterior device. On the other hand, the numerical value "0" as the first attenuation factor is calculated and outputted to the first multiplying means 591 under the condition that the audio signal processed by the second audio signal processing means 120 is requested by the exterior device.

The numerical value "1" as the second attenuation factor is calculated and outputted to the first multiplying means 591 under the condition that the audio signal processed by the first audio signal processing means 110 is requested by the exterior device. On the other hand, the numerical value "0" as the second attenuation factor is calculated and outputted to the first multiplying means 591 under the condition that the audio signal processed by the second audio signal processing means 120 is requested by the exterior device.

The attenuation factor calculating means 720 includes an attenuation factor adjusting unit 730, a switching unit 736, and a detecting unit 737. The attenuation factor adjusting unit 730 includes a gain value setting unit 731 and an integrating unit 732. The gain value setting unit 731 is operative to receive a gain value from the detecting unit 737, and output the gain value to the integrating unit 732. The integrating unit 732 is operative to receive the gain value from the gain value setting unit 731, calculating an attenuation factor based on the gain value and an accumulation value, output the attenuation factor to the switching unit 736, while the switching unit 736 is operative to receive the attenuation factor from the integrating unit 732, and output the attenuation factor to any one of the first multiplying means 591, the second multiplying means 592, and the detecting unit 737.

Here, the accumulation value is obtained from the attenuation factor calculated by the integrating unit 732 in a process period just before a current process period. The integrating unit 732 is operative to update and output the attenuation factor to the switching unit 736 in each process period, and gradually bring the attenuation factor to the gain value within the predetermined period.

The switching unit 736 an input terminal electrically connected to the integrating unit 732, a first output terminal electrically connected to the first multiplying means 591, a second output terminal electrically connected to the second multiplying means 592, and third output terminal electrically connected to the detecting unit 737. The detecting unit 737 is operative to output a select signal to the switching unit 736, and control the switching unit 736 to allow the switching unit 736 to output the attenuation factor to each of the first multiplying means 591, second multiplying means 592, and detecting unit 737. The switching unit 736 is operative to receive the attenuation factor from the attenuation factor adjusting unit 730, and output the attenuation factor to each of the detecting unit 737, the first multiplying means 591, and the second multiplying means 592. The detecting unit 737 is operative to receive the attenuation factor from the switching unit 736, output the attenuation factor to the attenuation factor adjusting unit 730, and output a select signal to the switching unit 736.

The following description will then be directed to the case that the audio signal to be outputted to the exterior device is switched from the audio signal processed by the first audio signal processing means 110 to the audio signal processed by the second audio signal processing means 120.

The gain value "0.5" is firstly received by the attenuation factor adjusting unit 730 from the detecting unit 737. The attenuation factor is then updated and adjusted by the attenuation factor adjusting unit 730, the attenuation factor "1" being gradually changed to the attenuation factor "0.5", the updated attenuation factor being outputted to each of the first multiplying means 591 and the detecting unit 737.

The switching unit 736 is then controlled by the detecting unit 737 to allow the switching unit 736 to output the attenuation factor received from the integrating unit 732 to the detecting unit 737 under the condition that the attenuation factor "0.5" is detected by the detecting unit 737.

The gain value "0" is then outputted by the detecting unit 737 to the attenuation factor adjusting unit 730. The attenuation factor is then updated and adjusted by the attenuation factor adjusting unit 730, the attenuation factor "0.5" being gradually changed to the attenuation factor "0", the updated attenuation factor being outputted to each of the first multiplying means 591 and the detecting unit 737.

The gain value "0.5" is then outputted by the detecting unit 737 to the attenuation factor adjusting unit 730. The attenuation factor is then updated and adjusted by the attenuation factor adjusting unit 730, the attenuation factor "0" being gradually changed to the attenuation factor "0.5", the updated attenuation factor being outputted to each of the second multiplying means 592 and the detecting unit 737.

The switching unit 736 is then controlled by the detecting unit 737 to allow the switching unit 736 to output the attenuation factor received from the integrating unit 732 to the first multiplying means 591 under the condition that the attenuation factor "0.5" is detected by the detecting unit 737.

The gain value "0" is then outputted by the detecting unit 737 to the attenuation factor adjusting unit 730. The attenuation factor is then updated and adjusted by the attenuation factor adjusting unit 730, the attenuation factor "0.5" being gradually changed to the attenuation factor "0", the updated attenuation factor being outputted to each of the first multiplying means 591 and the detecting unit 737.

The switching unit 736 is then controlled by the detecting unit 737 to allow the switching unit 736 to output the attenuation factor received from the integrating unit 732 to the detecting unit 737 under the condition that the attenuation factor "0" is detected by the detecting unit 737.

The gain value "0.5" is then outputted by the detecting unit 737 to the attenuation factor adjusting unit 730. The switching unit 736 is then controlled by the detecting unit 737 to allow the switching unit 736 to output the attenuation factor received from the integrating unit 732 to the second multiplying means 592 under the condition that the attenuation factor "0.5" is detected by the detecting unit 737.

The gain value "1" is then outputted by the detecting unit 737 to the attenuation factor adjusting unit 730. The attenuation factor is then updated and adjusted by the attenuation factor adjusting unit 730, the attenuation factor "0.5" being gradually changed to the attenuation factor "1", the updated attenuation factor being outputted to each of the second multiplying means 592 and the detecting unit 737.

The sixth embodiment of the audio signal processing apparatus 600 according to the present invention may be realized by a digital signal processor.

From the above detail description, it will be understood that the audio signal processing apparatus and the audio signal processing method according to the sixth embodiment of the present invention can have the audio signal continuously outputted to the exterior device without being instantaneously interrupted when the audio signal to be outputted to the exterior device is switched from the audio signal processed by one of the first and second audio signal processing units to the audio signal processed by the other of the first and second audio signal processing units.

The audio signal processing apparatus and the audio signal processing method according to the sixth embodiment of the present invention can reduce noises resulting from the signal difference between the audio signal processed by one of the first and second audio signal processing units and the audio signal processed by the other of the first and second audio signal processing units when the audio signal to be outputted to the exterior device is switched from the audio signal processed by one of the first and second audio signal processing units to the audio signal processed by the other of the first and second audio signal processing units.

The constitution of the seventh embodiment of the audio signal processing apparatus 700 according to the present invention will firstly be described hereinafter with reference to FIG. 9.

Figure 9:
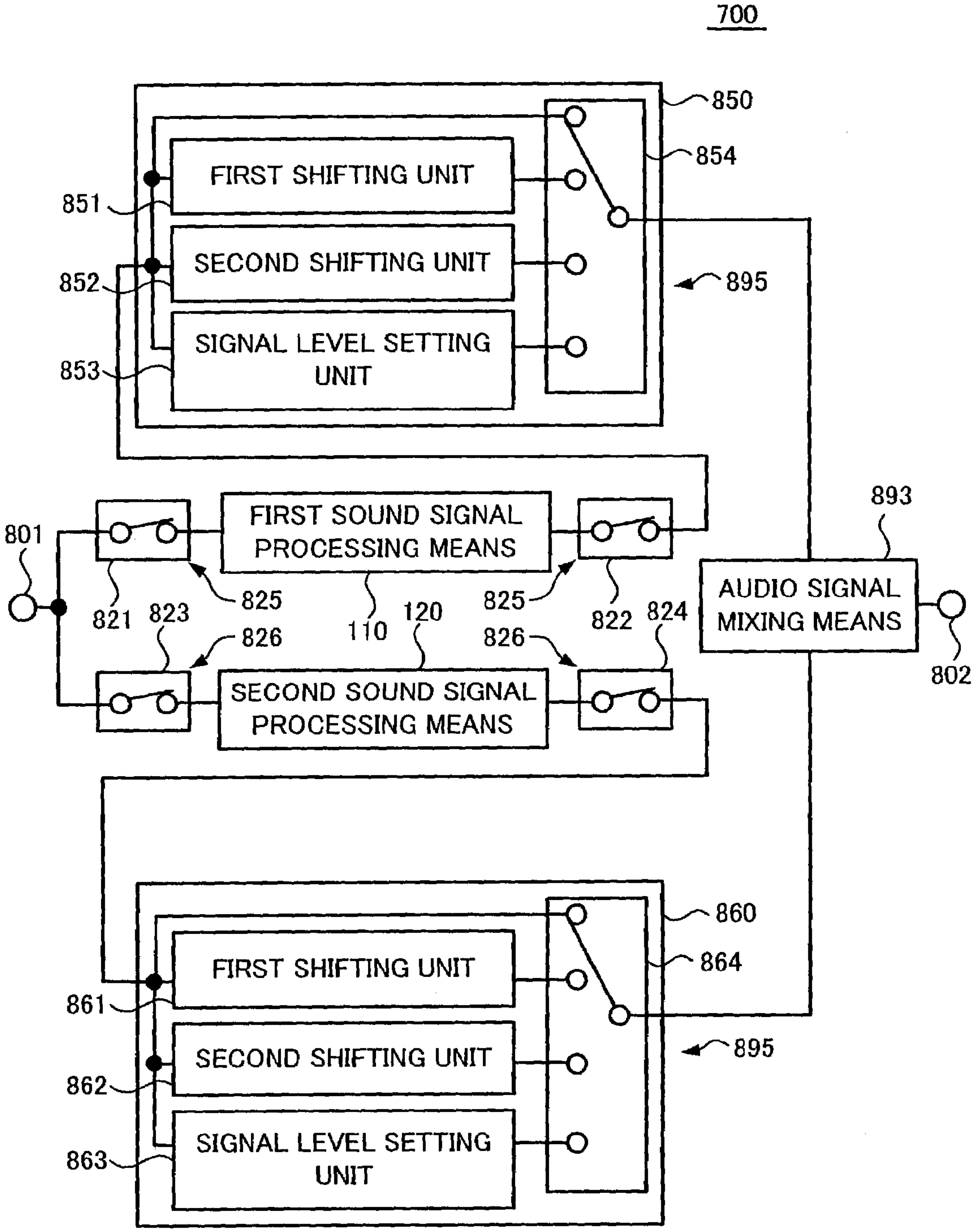
FIG. 9 is a block diagram of the seventh embodiment of the audio signal processing apparatus according to the present invention.
Figure 10:
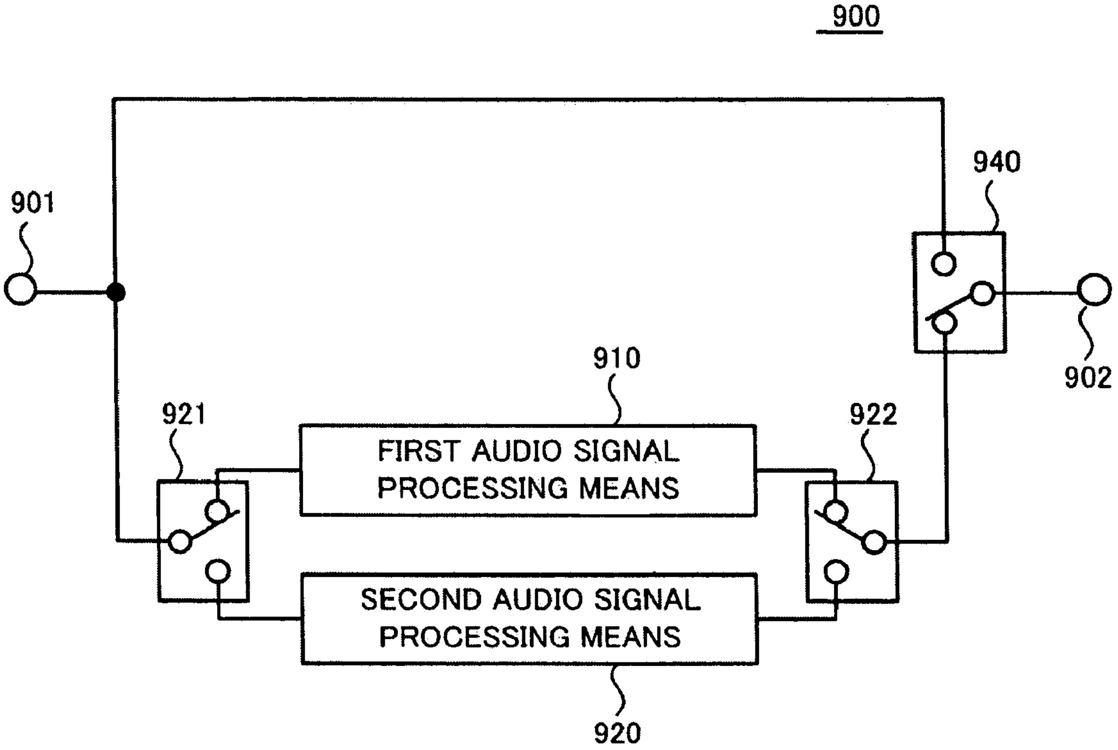
FIG. 10 Prior Art
FIG. 10 is a block diagram of the conventional audio signal processing apparatus.

The audio signal processing apparatus 700 is shown in FIG. 9 as comprising first audio signal processing means 110 for processing an audio signal having a signal level within a first process time, second audio signal processing means 120 for processing the audio signal within a second process time which is different from the first process time, first selecting means 825 for allowing the audio signal to be received by one of the first and second audio signal processing means 110 and 120, second selecting means 826 for allowing the audio signal to be received by the other of the first and second audio signal processing means 110 and 120, signal level changing means 895 for selectively attenuating the audio signals respectively processed by the first and second audio signal processing means 110 and 120 within a predetermined time in association with each of the first process time of the first audio signal processing means 110 and the second process time of the second audio signal processing means 120, and audio signal mixing means 893 for mixing and outputting the audio signals received from the signal level changing means 895.

The signal level changing means 895 is operative to selectively attenuate the audio signals respectively processed by the first and second audio signal processing means 110 and 120 when the audio signal to be outputted by the audio signal mixing means 893 is switched from the audio signal processed by one of the first and second audio signal processing means 110 and 120 to the audio signal processed by the other of the first and second audio signal processing means 110 and 120. The first switching circuit 821 and the second switching circuit 822 collectively constitute first selecting means, while the third switching circuit 823 and the fourth switching circuit 824 collectively constitute second selecting means. The first selecting means 825 is operative to input the audio signal to the first audio signal processing means 110, and allow the audio signal processed by the first audio signal processing means 110 to be received by the first attenuating means 850, while the second selecting means 826 is operative to input the audio signal to the second audio signal processing means 120, and allow the audio signal processed by the second audio signal processing means 120 to be received by the second attenuating means 860. The first switching circuit 821 and the second switching circuit 822 respectively functions as first switching means 821 and second switching means 822. The third switching circuit 823 and the fourth switching circuit 824 respectively functions as third switching means 823 and fourth switching means 824.

The first attenuating means 850 and the second attenuating means 860 collectively constitute attenuating means for receiving the audio signal processed by the first audio signal processing means 110 from the second switching circuit 822 and the audio signal processed by the second audio signal processing means 120 from the fourth switching circuit 824, and selectively outputting the audio signal processed by the first audio signal processing means 110 and the audio signal processed by the second audio signal processing means 120 to the audio signal mixing means 893.

The input terminal 801 has the audio signal inputted therein, while the first switching circuit 821 has an input terminal electrically connected to the input terminal 801 to receive the audio signal from the exterior device through the input terminal 801. The third switching circuit 823 has an input terminal electrically connected to the input terminal 801 to receive the audio signal from the exterior device through the input terminal 801. The first switching circuit 821 has an output terminal, while the first audio signal processing means 110 has an input terminal electrically connected to the output terminal of the first switching circuit 821 to receive the audio signal from the first switching circuit 821. The third switching circuit 823 has an output terminal, while the second audio signal processing means 120 has an input terminal electrically connected to the output terminal of the third switching circuit 823 to receive the audio signal from the third switching circuit 823.

The first audio signal processing means 110 is operative to receive the audio signal from the input terminal 801 through the first switching circuit 821, process the audio signal received from the input terminal 801, and outputted the processed audio signal to the second switching circuit 822. The second switching circuit 822 is operative to receive the processed audio signal from first audio signal processing means 110, and have the processed audio signal received by the first attenuating means 850. The first switching circuit 821 and the second switching circuit 822 may be respectively constituted by toggle switches, or attachable and removable terminals.

The third switching circuit 823 is operative to receive the audio signal from the input terminal 801, and have the audio signal received by the second audio signal processing means 120. The second audio signal processing means 120 is operative to receive the audio signal from the input terminal 801 through the third switching circuit 823, process the audio signal received from the input terminal 801, and output the processed audio signal to the fourth switching circuit 824.

The fourth switching circuit 824 is operative to receive the processed audio signal from the second audio signal processing means 120, and have the processed audio signal received by the second attenuating means 860. The third switching circuit 823 and the fourth switching circuit 824 may be respectively constituted by toggle switches, or attachable and removable terminals. The first attenuating means 850 includes a first shifting unit 851, a second shifting unit 852, a signal level setting unit 853, and a switching unit 854.

The first shifting unit 851 is operative to receive the processed audio signal from the first audio signal processing means 110 through the second switching circuit 821, and rightward shift digits in association with the signal level of the audio signal processed by the first audio signal processing means 110 to obtain an audio signal having a half of the signal level of the audio signal processed by the first audio signal processing means 110. The second shifting unit 852 is operative to receive the processed audio signal from the first audio signal processing means 110 through the second switching circuit 821, and rightward shift digits in association with the signal level of the audio signal processed by the first audio signal processing means 110 to obtain an audio signal having a quarter of the signal level of the audio signal processed by the first audio signal processing means 110.

The signal level setting unit 853 is operative to receive the processed audio signal from the first audio signal processing means 110 through the second switching circuit 821, and output a signal having a predetermined constant level to the switching unit 854. The switching unit 854 is operative to receive the processed audio signal from the first audio signal processing means 110 through the second switching circuit 821, and selectively output the sifted audio signal received from the first shifting unit 851, the sifted audio signal received from the second shifting unit 852, the signal received from the switching unit 854.

The sifted audio signal received from the first shifting unit 851, the sifted audio signal received from the second shifting unit 852, the signal received from the switching unit 854 are sequentially outputted by the switching unit 854 based on a predetermined first sequence under the condition that the audio signal to be outputted to the exterior device is switched from the audio signal processed by the first audio signal processing means 110 to the audio signal processed by the second audio signal processing means 120. On the other hand, the sifted audio signal received from the first shifting unit 851, the sifted audio signal received from the second shifting unit 852, the signal received from the switching unit 854 are sequentially outputted by the switching unit 854 based on a predetermined second sequence under the condition that the audio signal to be outputted to the exterior device is switched from the audio signal processed by the second audio signal processing means 120 to the audio signal processed by the first audio signal processing means 110.

The second attenuating means 860 includes a first shifting unit 861, a second shifting unit 862, a signal level setting unit 863, and a switching unit 864. The first shifting unit 861 is operative to receive the processed audio signal from the second audio signal processing means 120 through the fourth switching circuit 824, and rightward shift digits in association with the signal level of the audio signal processed by the first audio signal processing means 120 to obtain an audio signal having a half of the signal level of the audio signal processed by the first audio signal processing means 120.

The second shifting unit 862 is operative to receive the processed audio signal from the second audio signal processing means 120 through the fourth switching circuit 824, and rightward shift digits in association with the signal level of the audio signal processed by the second audio signal processing means 120 to obtain an audio signal having a quarter of the signal level of the audio signal processed by the second audio signal processing means 120. The signal level setting unit 863 is operative to receive the processed audio signal from the second audio signal processing means 120 through the fourth switching circuit 824, and output a signal having a predetermined constant level to the switching unit 864.

The switching unit 864 having a first input terminal electrically connected to the output terminal of the first shifting unit 861, a second input terminal electrically connected to the second shifting unit 862, a third input terminal electrically connected to the output terminal of the signal level setting unit 863, an output terminal electrically connected to the input terminal of the audio signal mixing means 893. The switching unit 864 s operative to selectively output the sifted audio signal received from the first shifting unit 861, the sifted audio signal received from the second shifting unit 862, the signal received from the switching unit 864.

The sifted audio signal received from the first shifting unit 861, the sifted audio signal received from the second shifting unit 862, the signal received from the signal level setting unit 863 are sequentially outputted by the switching unit 864 based on a predetermined first sequence under the condition that the audio signal to be outputted to the exterior device is switched from the audio signal processed by the first audio signal processing means 110 to the audio signal processed by the second audio signal processing means 120. On the other hand, the sifted audio signal received from the first shifting unit 861, the sifted audio signal received from the second shifting unit 862, the signal received from the signal level setting unit 863 are sequentially outputted by the switching unit 864 based on a predetermined second sequence under the condition that the audio signal to be outputted to the exterior device is switched from the audio signal processed by the second audio signal processing means 120 to the audio signal processed by the first audio signal processing means 110.

The audio signal mixing means 893 is operative to receive the audio signal from the first attenuating means 850 and the audio signal from the second attenuating means 860, and mix the audio signal received from the first attenuating means 850 with the audio signal received from the second attenuating means 860, and the mixed audio signal to the exterior device through the output terminal 102. The output terminal 102 having the audio signal outputted therethrough. The output terminal 802 is electrically connected to the exterior device to have the mixed audio signal received by the exterior device. The seventh embodiment of the audio signal processing apparatus 700 according to the present invention may be realized by a digital signal processor.

From the above detail description, it will be understood that the audio signal processing apparatus and the audio signal processing method according to the seventh embodiment of the present invention can have the audio signal continuously outputted to the exterior device without being instantaneously interrupted when the audio signal to be outputted to the exterior device is switched from the audio signal processed by one of the first and second audio signal processing units to the audio signal processed by the other of the first and second audio signal processing units. The audio signal processing apparatus and the audio signal processing method according to the seventh embodiment of the present invention can reduce noises resulting from the signal difference between the audio signal processed by one of the first and second audio signal processing units and the audio signal processed by the other of the first and second audio signal processing units when the audio signal to be outputted to the exterior device is switched from the audio signal processed by one of the first and second audio signal processing units to the audio signal processed by the other of the first and second audio signal processing units.

As will be seen from the above description, the audio signal processing apparatus and the audio signal processing method according to the present invention can have the audio signal continuously outputted to the exterior device without being instantaneously interrupted when the audio signal to be outputted to the exterior device is switched from the audio signal processed by one of the first and second audio signal processing units to the audio signal processed by the other of the first and second audio signal processing units. The audio signal processing apparatus and the audio signal processing method according to the present invention can enhance the quality of the audio signal to be outputted to the exterior device to ensure that the audio signal to be outputted to the exterior device is seamlessly switched from the audio signal processed by one of the audio signal processing units to the audio signal processed by the other of the audio signal processing units.

While the subject invention has been described with relation to the embodiments, various modifications and adaptations thereof will now be apparent to those skilled in the art as far as such modifications and adaptations fall within the scope of the appended claims intended to be covered thereby.

What is claimed is:

1. An audio signal processing apparatus, comprising:

first audio signal processing means for processing an audio signal within a first process time;

second audio signal processing means for processing said audio signal within a second process time which is different from said first process time;

audio signal delaying means for delaying said audio signal in response to each of said first process time of said first audio signal processing means and said second process time of said second audio signal processing means;

audio signal outputting means for selectively outputting said audio signals respectively processed by said first and second audio signal processing means;

selecting means for allowing said audio signals respectively processed by said first and second audio signal processing means to be selectively received by said audio signal outputting means, and process time calculating means for calculating said first process time in which said audio signal is processed by said first audio signal processing means, and said second process time in which said audio signal is processed by said second audio signal processing means, wherein said audio signal outputting means is operative to output said audio signal delayed by said audio signal delaying means to ensure that said audio signal to be outputted to said exterior device is seamlessly switched from said audio signal processed by one of said first and second audio signal processing means to said audio signal processed by the other of said first and second audio signal processing means when said audio signal to be received by said audio signal outputting means is switched by said selecting means from said audio signal processed by one of said first and second audio signal processing means to said audio signal processed by the other of said first and second audio signal processing means, and said process time calculating means is operative to allow said audio signal delaying means to receive and store said first and second process time.

* * * * *